US012628198B2

(12) United States Patent
Patil et al.

(10) Patent No.: US 12,628,198 B2
(45) Date of Patent: May 12, 2026

(54) CONCURRENT TRANSMISSION SCHEDULING AND PRIORITIZATION

(71) Applicant: QUALCOMM Incorporated, San Diego, CA (US)

(72) Inventors: Kiran Patil, San Diego, CA (US); Michael Levitsky, Rehovot (IL); Bhupesh Manoharlal Umatt, Poway, CA (US); Cheol Hee Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 660 days.

(21) Appl. No.: 18/052,766

(22) Filed: Nov. 4, 2022

(65) Prior Publication Data

US 2024/0155673 A1     May 9, 2024

(51) Int. Cl.
*H04W 74/0808*     (2024.01)
*H04L 5/16*     (2006.01)
*H04W 74/08*     (2024.01)

(52) U.S. Cl.
CPC ........... *H04W 74/0808* (2013.01); *H04L 5/16* (2013.01); *H04W 74/0875* (2013.01)

(58) Field of Classification Search
CPC ......... H04W 74/0808; H04W 74/0875; H04W 72/40; H04W 72/56; H04W 88/06; H04W 92/18; H04W 72/1215; H04L 5/16
See application file for complete search history.

(56) References Cited

U.S. PATENT DOCUMENTS

| 2021/0105661 | A1 | 4/2021 | Baghel et al. |
| 2021/0204307 | A1 | 7/2021 | Lee et al. |
| 2025/0324453 | A1 | 10/2025 | Patil et al. |

FOREIGN PATENT DOCUMENTS

| EP | 3907914 A1 | 11/2021 |
| WO | 2021223046 A1 | 11/2021 |

OTHER PUBLICATIONS

Garcia M.H.C., et al., "A Tutorial on 5G NR V2X Communications", IEEE Communications Surveys and Tutorials, vol. 23, No. 3, Feb. 3, 2021, pp. 1972-2026, XP011873186, section "C. Congestion control", p. 2003, Section A. In device coexistence between LTE V2X and NR V2X sidelink, p. 2011-p. 2013, Section B. Support for Cross—RAT Control, p. 2013 p. 1997, right-hand column, paragraph second.
International Search Report and Written Opinion—PCT/US2023/076108—ISA/EPO—Feb. 6, 2024.
European Search Report—EP25224867—Search Authority—The Hague—Jan. 19, 2026.

*Primary Examiner* — Eric Myers
(74) *Attorney, Agent, or Firm* — Harrity & Harrity, LLP

(57) ABSTRACT

Various aspects of the present disclosure generally relate to wireless communication. In some aspects, a user equipment (UE) may obtain one or more joint scheduling rules associated with Long Term Evolution (LIE) communications and New Radio (NR) communications in a half-duplex communication system. The UE may identify a channel busy ratio (CBR) associated with the half-duplex communication system. The UE may prioritize an LTE communication or an NR communication based at least in part on the one or more joint scheduling rules and the CBR. Numerous other aspects are described.

30 Claims, 13 Drawing Sheets

Network Node 110

UE 120

Obtain one or more joint scheduling rules associated with LTE communications and NR communications in a half-duplex communication system
705

Identify a CBR associated with the half-duplex communication system
710

Prioritize an LTE communication or an LTE communication based at least in part on the one or more joint scheduling rules and the CBR
715

700

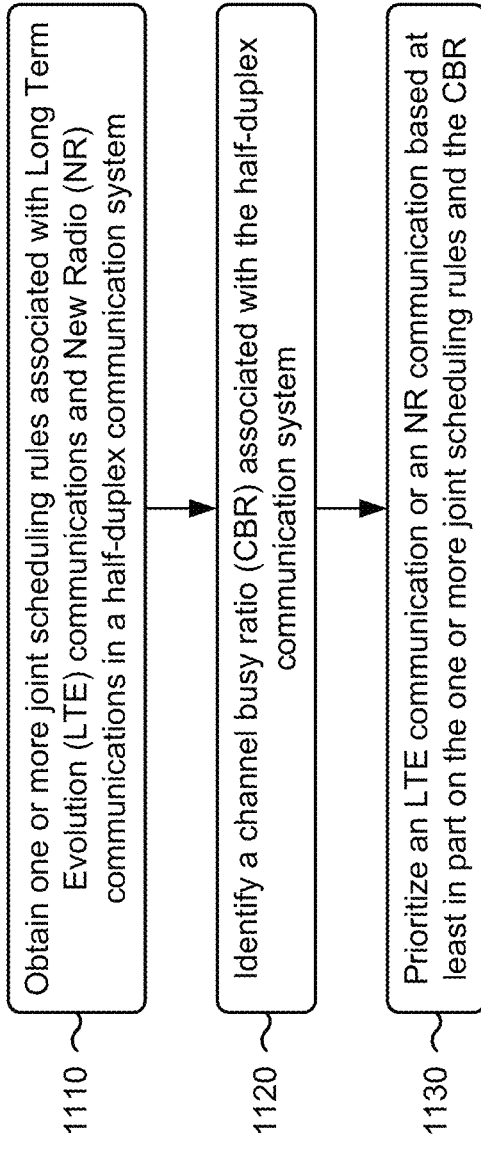

Obtain one or more joint scheduling rules associated with Long Term Evolution (LTE) communications and New Radio (NR) communications in a half-duplex communication system

1110

Identify a channel busy ratio (CBR) associated with the half-duplex communication system

1120

Prioritize an LTE communication or an NR communication based at least in part on the one or more joint scheduling rules and the CBR

1130

1100

FIG. 11

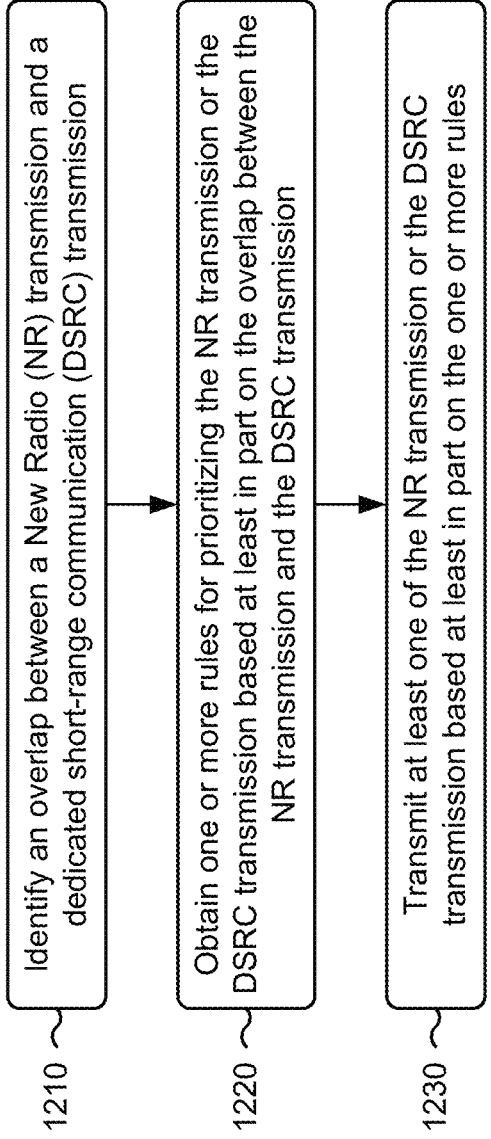

1210 — Identify an overlap between a New Radio (NR) transmission and a dedicated short-range communication (DSRC) transmission 1220 — Obtain one or more rules for prioritizing the NR transmission or the DSRC transmission based at least in part on the overlap between the NR transmission and the DSRC transmission 1230 — Transmit at least one of the NR transmission or the DSRC transmission based at least in part on the one or more rules

CONCURRENT TRANSMISSION SCHEDULING AND PRIORITIZATION

FIELD OF THE DISCLOSURE

Aspects of the present disclosure generally relate to wireless communication and to techniques and apparatuses for concurrent transmission scheduling and prioritization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LIE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining one or more joint scheduling rules associated with Long Term Evolution (LTE) communications and New Radio (NR) communications in a half-duplex communication system. The method may include identifying a channel busy ratio (CBR) associated with the half-duplex communication system. The method may include prioritizing an LTE communication or an NR communication based at least in part on the one or more joint scheduling rules and the CBR.

Some aspects described herein relate to a method of wireless communication performed by a UE. The method may include identifying an overlap between an NR transmission and a dedicated short-range communication (DSRC) transmission. The method may include obtaining one or more rules for prioritizing the NR transmission or the DSRC transmission based at least in part on the overlap between the NR transmission and the DSRC transmission. The method may include transmitting at least one of the NR transmission or the DSRC transmission based at least in part on the one or more rules.

Some aspects described herein relate to an apparatus for wireless communication performed by a UE. The apparatus may include a memory and one or more processors, coupled to the memory. The one or more processors may be configured to obtain one or more joint scheduling rules associated with LTE communications and NR communications in a half-duplex communication system. The one or more processors may be configured to identify a CBR associated with the half-duplex communication system. The one or more processors may be configured to prioritize an LTE communication or an NR communication based at least in part on the one or more joint scheduling rules and the CBR.

Some aspects described herein relate to an apparatus for wireless communication performed by a UE. The apparatus may include a memory and one or more processors, coupled to the memory. The one or more processors may be configured to identify an overlap between an NR transmission and a DSRC transmission. The one or more processors may be configured to obtain one or more rules for prioritizing the NR transmission or the DSRC transmission based at least in part on the overlap between the NR transmission and the DSRC transmission. The one or more processors may be configured to transmit at least one of the NR transmission or the DSRC transmission based at least in part on the one or more rules.

Some aspects described herein relate to a non-transitory computer-readable medium that stores a set of instructions for wireless communication by a UE. The set of instructions, when executed by one or more processors of the UE, may cause the UE to obtain one or more joint scheduling rules associated with LTE communications and NR communications in a half-duplex communication system. The set of instructions, when executed by one or more processors of the UE, may cause the UE to identify a CBR associated with the half-duplex communication system. The set of instructions, when executed by one or more processors of the UE, may cause the UE to prioritize an LTE communication or an NR communication based at least in part on the one or more joint scheduling rules and the CBR.

Some aspects described herein relate to a non-transitory computer-readable medium that stores a set of instructions for wireless communication by a UE. The set of instructions, when executed by one or more processors of the UE, may cause the UE to identify an overlap between an NR transmission and a DSRC transmission. The set of instructions, when executed by one or more processors of the UE, may cause the UE to obtain one or more rules for prioritizing the NR transmission or the DSRC transmission based at least in part on the overlap between the NR transmission and the DSRC transmission. The set of instructions, when executed by one or more processors of the UE, may cause the UE to transmit at least one of the NR transmission or the DSRC transmission based at least in part on the one or more rules.

Some aspects described herein relate to an apparatus for wireless communication. The apparatus may include means for obtaining one or more joint scheduling rules associated with LTE communications and NR communications in a half-duplex communication system. The apparatus may include means for identifying a CBR associated with the half-duplex communication system. The apparatus may include means for prioritizing an LTE communication or an NR communication based at least in part on the one or more joint scheduling rules and the CBR.

Some aspects described herein relate to an apparatus for wireless communication. The apparatus may include means for identifying an overlap between an NR transmission and a DSRC transmission. The apparatus may include means for obtaining one or more rules for prioritizing the NR transmission or the DSRC transmission based at least in part on the overlap between the NR transmission and the DSRC transmission. The apparatus may include means for transmitting at least one of the NR transmission or the DSRC transmission based at least in part on the one or more rules.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example process performed, for example, by a UE, in accordance with the present disclosure.

FIG. 12 is a diagram illustrating an example process performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
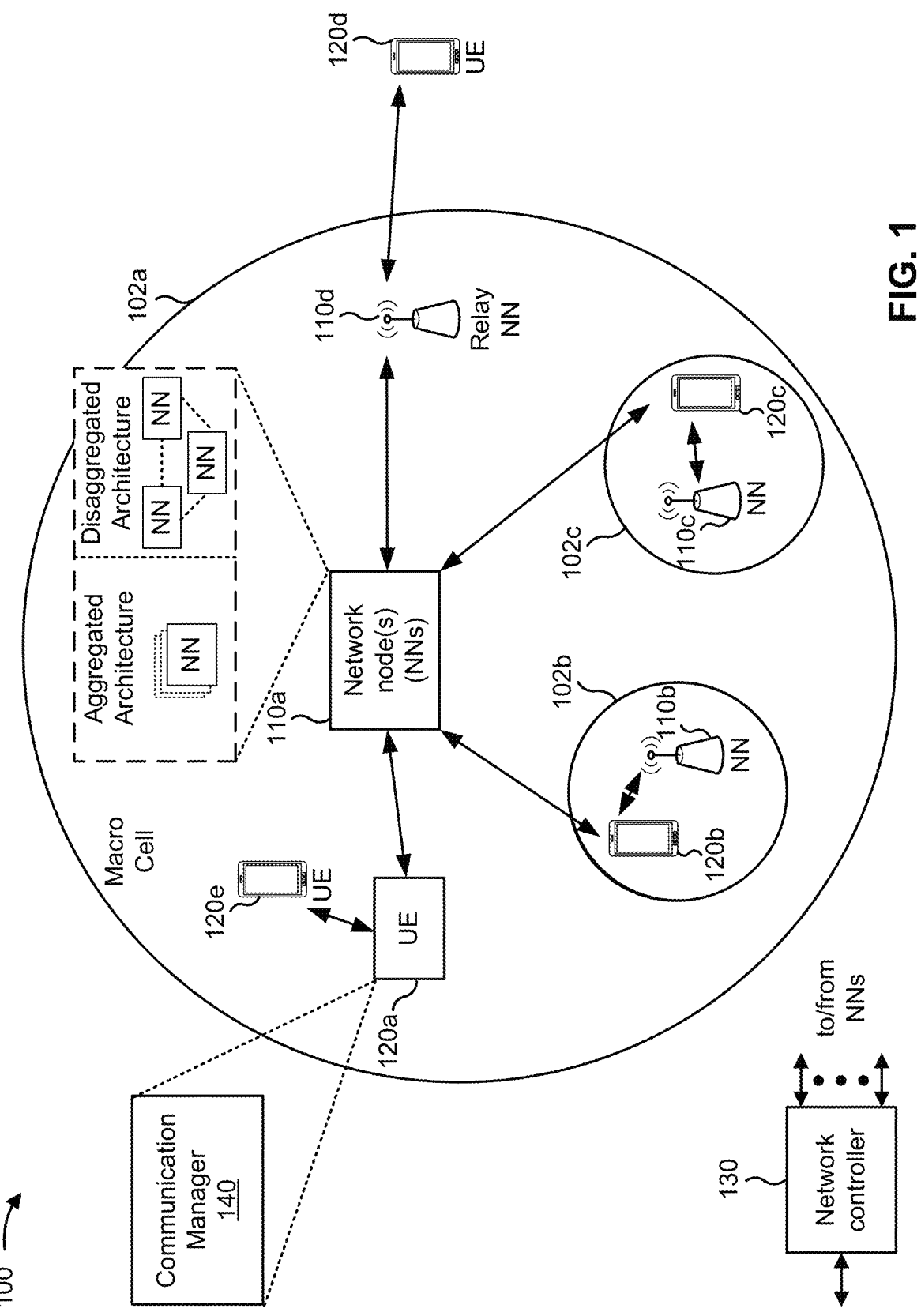
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain one or more joint scheduling rules associated with LTE communications and NR communications in a half-duplex communication system; identify a channel busy ratio (CBR) associated with the half-duplex communication system; and prioritize an LTE communication or an NR communication based at least in part on the one or more joint scheduling rules and the CBR. Additionally, or alternatively, the communication manager 140 may perform one or more other operations described herein.

In some aspects, the UE 120 may include a communication manager 140. As described in more detail elsewhere herein, the communication manager 140 may identify an overlap between an NR transmission and a DSRC transmission; obtain one or more rules for prioritizing the NR transmission or the DSRC transmission based at least in part on the overlap between the NR transmission and the DSRC transmission; and transmit at least one of the NR transmission or the DSRC transmission based at least in part on the one or more rules. Additionally, or alternatively, the communication manager 140 may perform one or more other operations described herein.

As indicated above, FIG. 1 is provided as an example. Other examples may differ from what is described with regard to FIG. 1.

Figure 2:
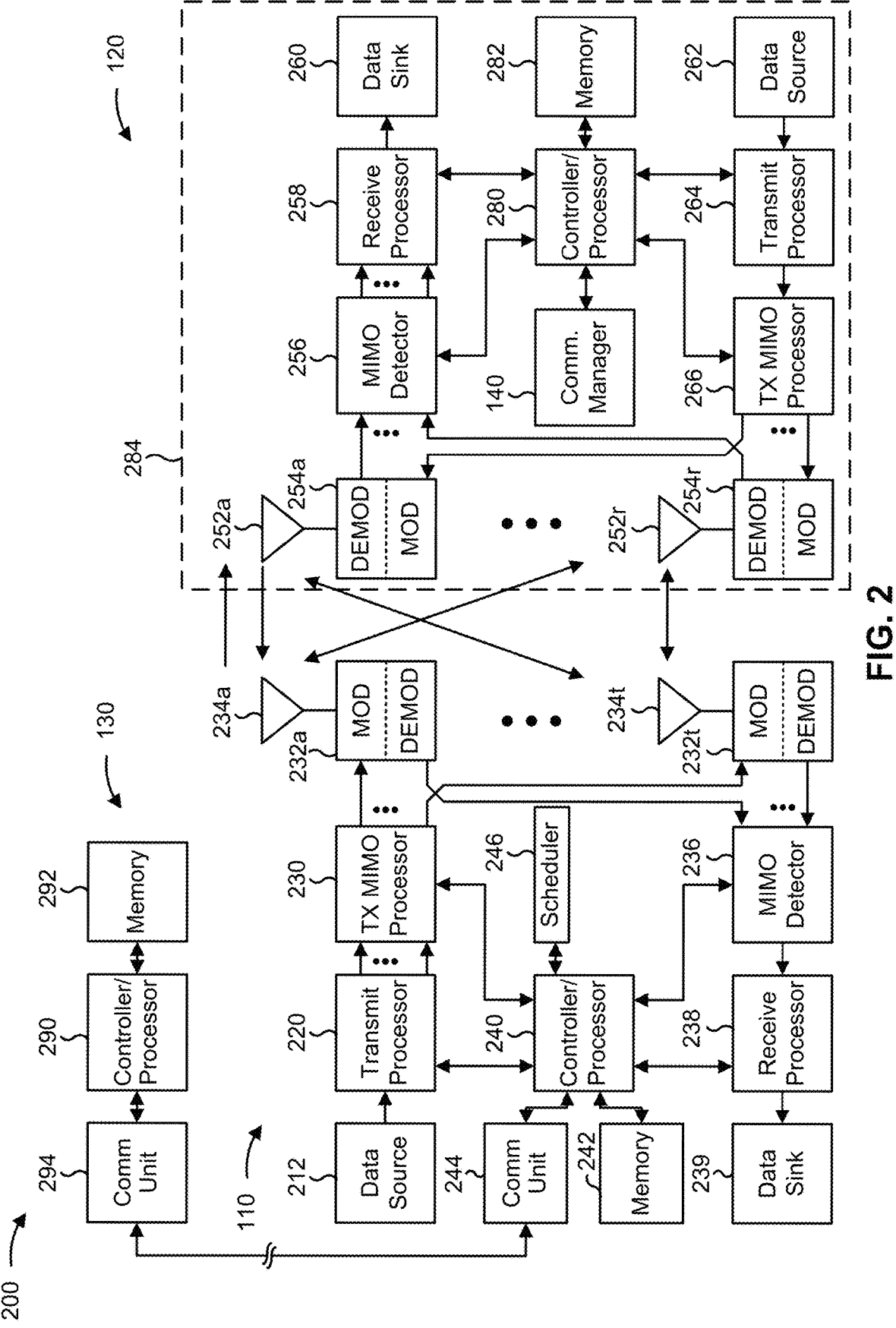
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-13).

The controller/processor 240 of the network node 110, the controller/processor 280 of the UE 120, and/or any other component(s) of FIG. 2 may perform one or more techniques associated with concurrent transmission scheduling and prioritization, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for obtaining one or more joint scheduling rules associated with LTE communications and NR communications in a half-duplex communication system; means for identifying a CBR associated with the half-duplex communication system; and/or means for prioritizing an LTE communication or an NR communication based at least in part on the one or more joint scheduling rules and the CBR. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for identifying an overlap between an NR transmission and a DSRC transmission; means for obtaining one or more rules for prioritizing the NR transmission or the DSRC transmission based at least in part on the overlap between the NR transmission and the DSRC transmission; and/or means for transmitting at least one of the NR transmission or the DSRC transmission based at least in part on the one or more rules. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
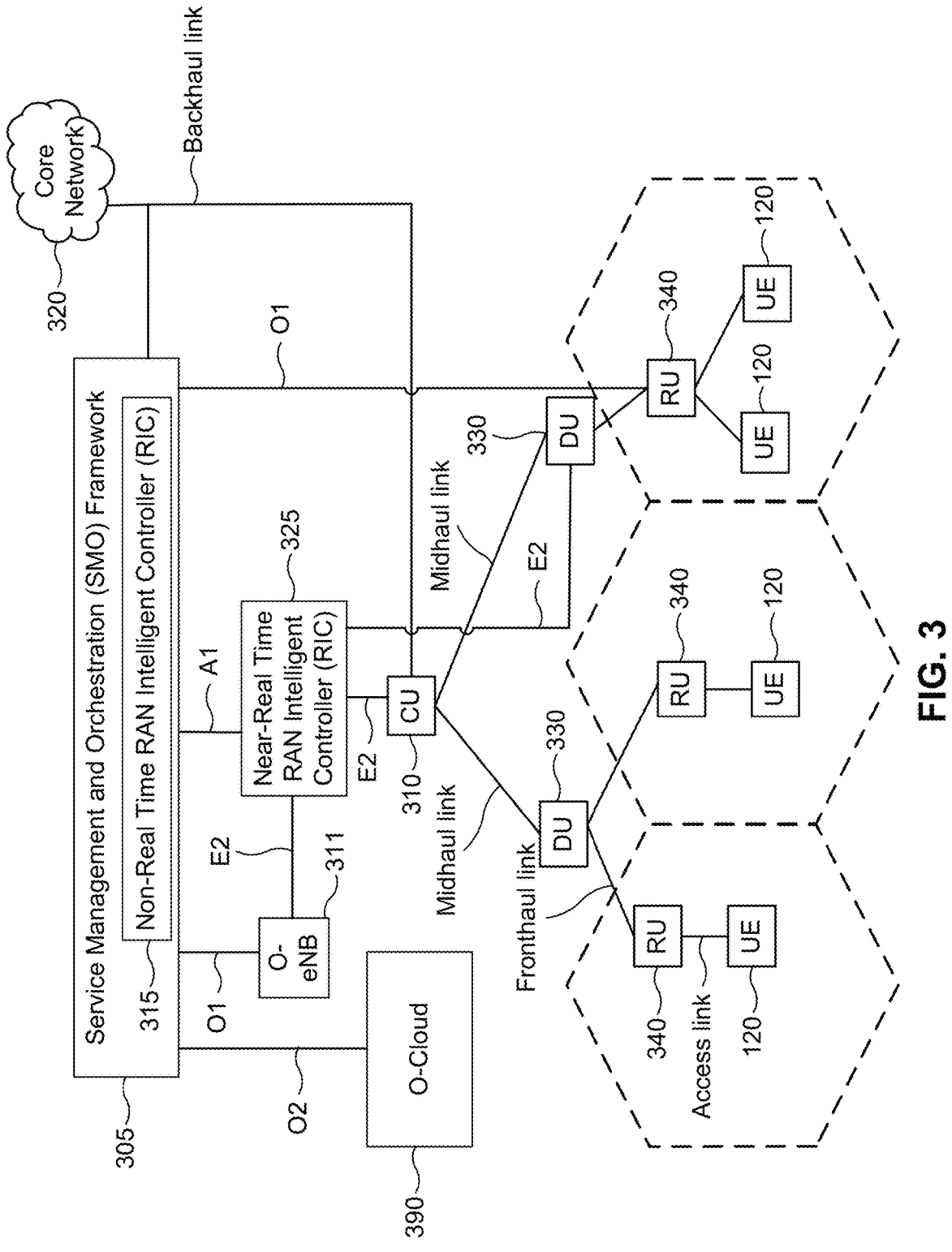
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as AI interface policies).

As indicated above, FIG. 3 is provided as an example. Other examples may differ from what is described with regard to FIG. 3.

Figure 4:
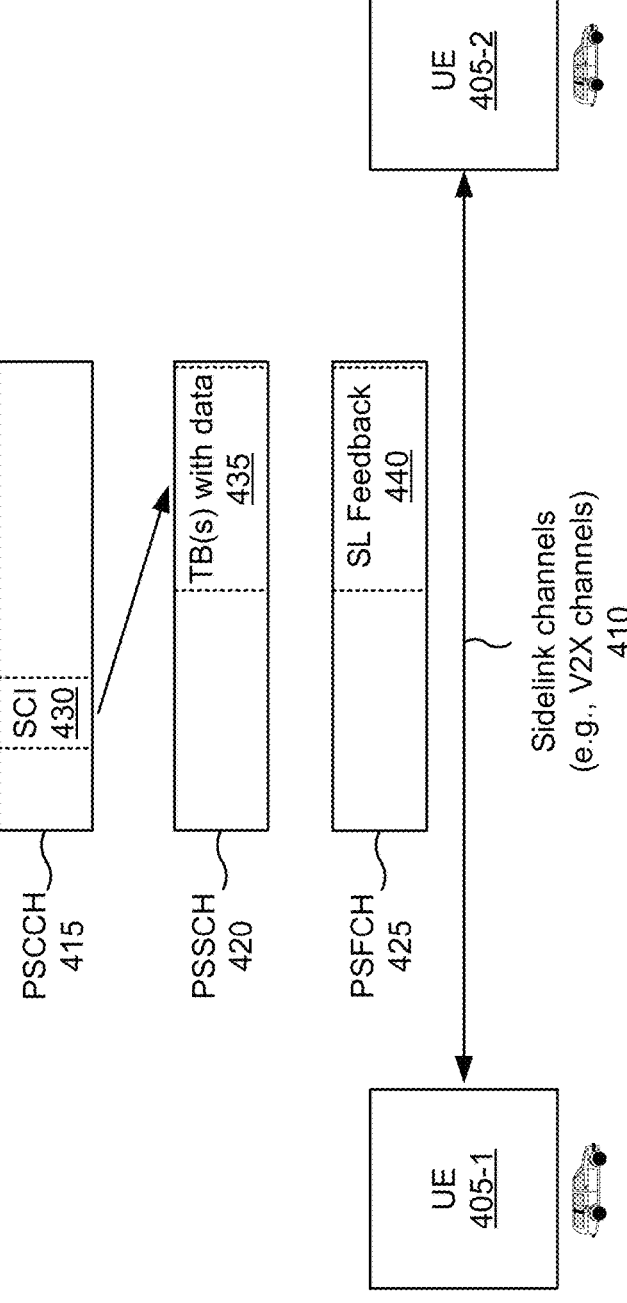
FIG. 4 is a diagram illustrating an example of sidelink communications and V2X communications, in accordance with the present disclosure.

FIG. 4 is a diagram illustrating an example 400 of sidelink communications and V2X communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In one example, the first UE 405-1 may be a first vehicle and the second UE 405-2 may be a second vehicle or a network node. The first vehicle and the second vehicle may communicate using V2X communications (such as V2V communications). In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a network node 110 (e.g., a base station, a CU, or a DU). For example, the UE 405 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 405 may operate using a transmission mode (e.g., Mode 2) where resource selection and/or scheduling is performed by the UE 405 (e.g., rather than a network node 110). In some aspects, the UE 405 may perform resource selection and/or scheduling by sensing channel availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
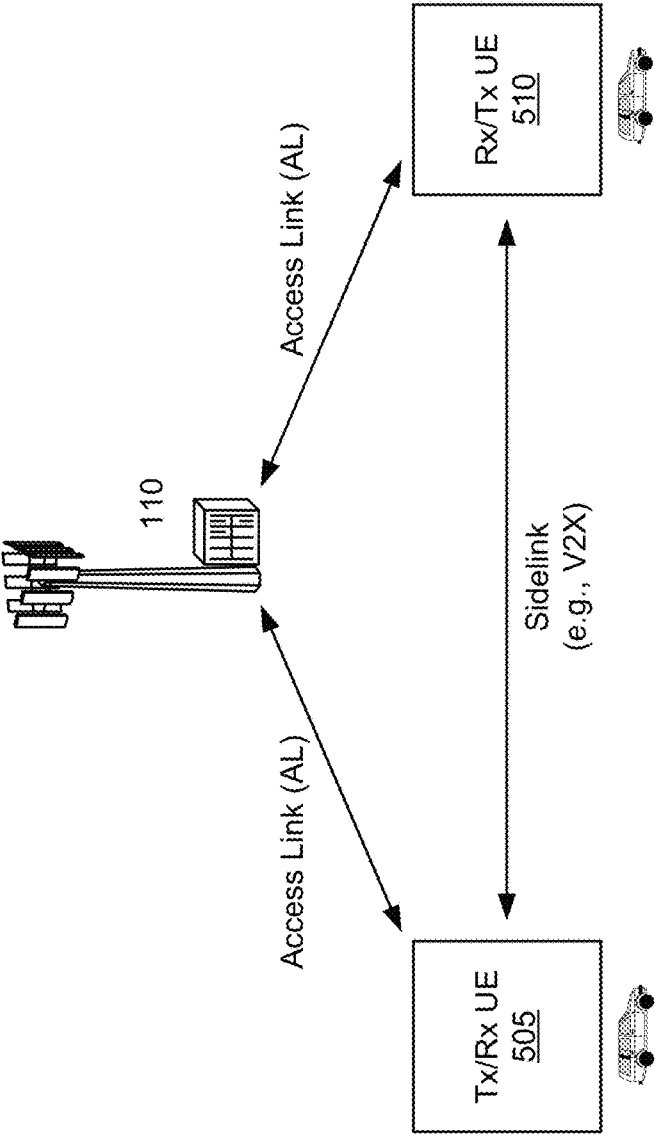
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. In some cases, the Tx/Rx UE 505 may be a first vehicle (such as the first vehicle 405-1) and the Tx/Rx UE 510 may be a second vehicle (such as the second vehicle 405-2) or a network node. As further shown, in some sidelink modes, a network node 110 may communicate with the Tx/Rx UE 505 (e.g., directly or via one or more network nodes), such as via a first access link. Additionally, or alternatively, in some sidelink modes, the network node 110 may communicate with the Rx/Tx UE 510 (e.g., directly or via one or more network nodes), such as via a first access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 5 is provided as an example. Other examples may differ from what is described with respect to FIG. 5.

Figure 6:
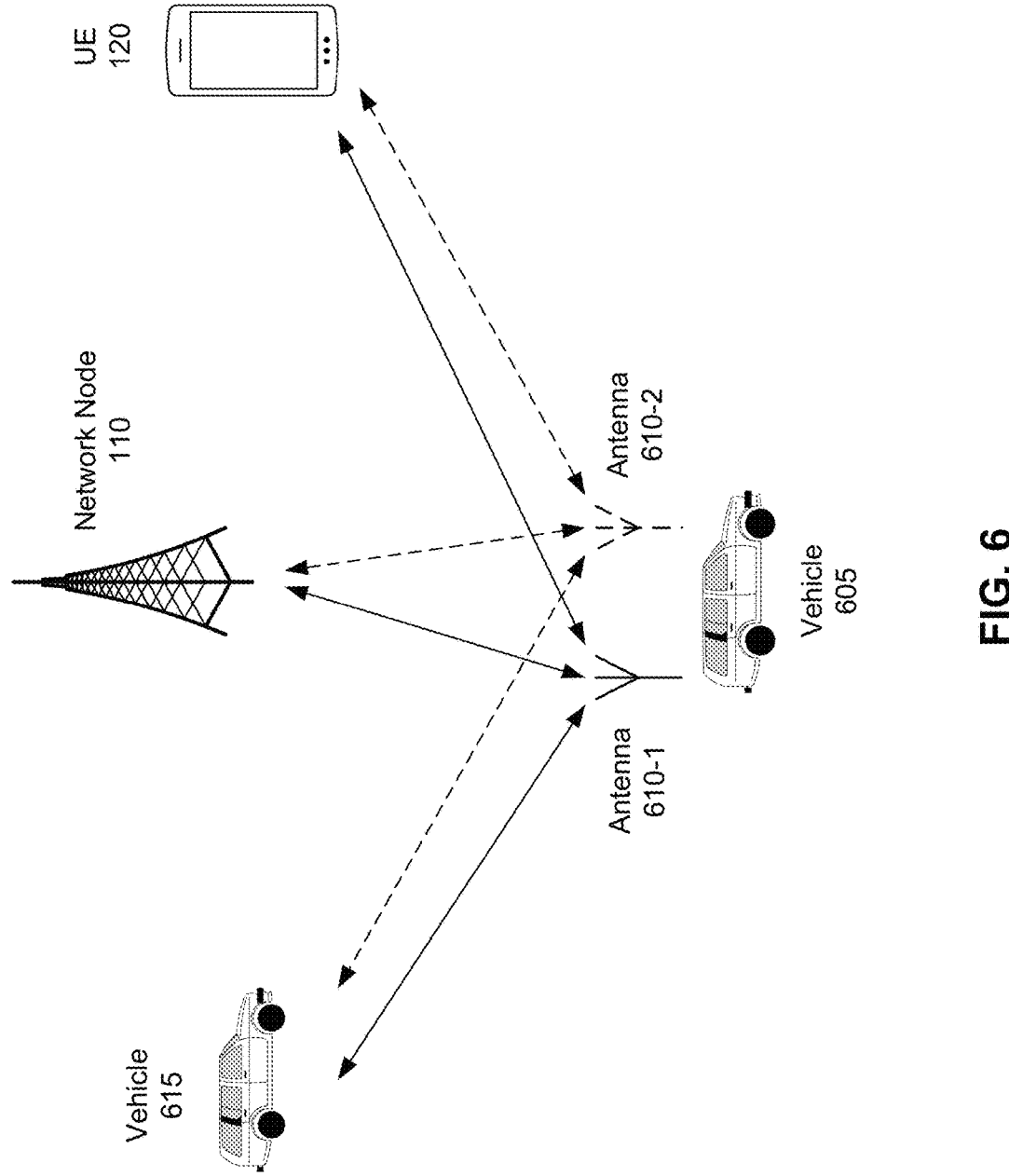
FIG. 6 is a diagram illustrating an example of vehicle-to-everything communications, in accordance with the present disclosure.

FIG. 6 is a diagram illustrating an example 600 of V2X communications, in accordance with the present disclosure. A vehicle 605 may include one or more antennas 610. For example, the vehicle 605 may include an antenna 610-1 for communicating with one or more other devices, such as another vehicle 615, the network node 110, or the UE 120, among other examples. The antenna 610-1 may be configured to communicate with the one or more other devices using one or more V2X technologies, such as NR V2X and LTE V2X. In another example, the vehicle 605 may include two antennas (such as the antenna 610-1 and an antenna 610-2) for communicating with the one or more devices.

In some cases, the different V2X technologies may be deployed on different channels in an intelligent transport system (ITS) band. A V2X transceiver may need to support the different V2X technologies (e.g., NR V2X and LTE V2X) concurrently for both transmission and reception. For automotive products, there may be two antennas (such as antennas 610-1 and 610-2) that are shared for transmission and reception and for the different technologies. This may be due, for example, to the high cost of cabling on the car platform and to poor isolation between the antennas. In some cases, the half-duplex nature of V2X technology may be due to the restriction of the shared antennas for transmission and reception in V2X. For example, once there is a transmission using any of the V2X technologies from any one of the antennas 610, there may be no reception for all of the V2X technologies on all of the antennas 610.

In some cases, each of the V2X technologies (NR V2X and LTE V2X) may select transmission resources independently using autonomous channel sensing (e.g., for the channel where the respective technology is deployed) and semi-persistent scheduling (SPS) transmission scheduling. Each V2X technology may attempt to minimize the negative impact of reception packet dropping due to the half-duplex limitations on the channel. In some cases, the autonomous scheduling processes of each respective V2X technology may search for available resources for transmission scheduling only on the channel that is associated with that V2X technology. If both of the V2X technologies select transmission resources independently, there is a likelihood that some portion of reception traffic (from the other technology) will be dropped.

In some cases, two transmission antennas (such as antennas 610-1 and 610-2) may be required for NR V2X transmissions, and MIMO may need to be supported. This may improve L 1E V2X performance when two transmissions having cyclic delay diversity (CDD) occur. Concurrent transmissions for both V2X technologies (via two antennas), where each antenna uses a single transmission, may not be acceptable. Concurrent transmissions using two antennas, where both V2X technology signals are transmitted simultaneously on different channels, may involve a more complicated, demanding, and costly RF front-end (RFFE) design that is not available with existing RF solutions. As a result, time division multiplexing (TDM) may need to be used for transmissions using concurrent V2X technologies. In some cases, arbitration may be required to select only one specific V2X technology to transmit at any given time if both V2X technologies are attempting to schedule transmissions using the same resources or using resources that overlap in time. However, current arbitration methods are not sufficient for selecting between the V2X technologies to reduce or eliminate concurrent transmissions. This may result in an increased number of dropped communications. The techniques and apparatuses described herein may reduce the number of dropped communications based at least in part on transmission scheduling using LTE V2X and NR V2X. Additional details are described below in connection with FIG. 7.

As indicated above, FIG. 6 is provided as an example. Other examples may differ from what is described with respect to FIG. 6.

Figure 7:
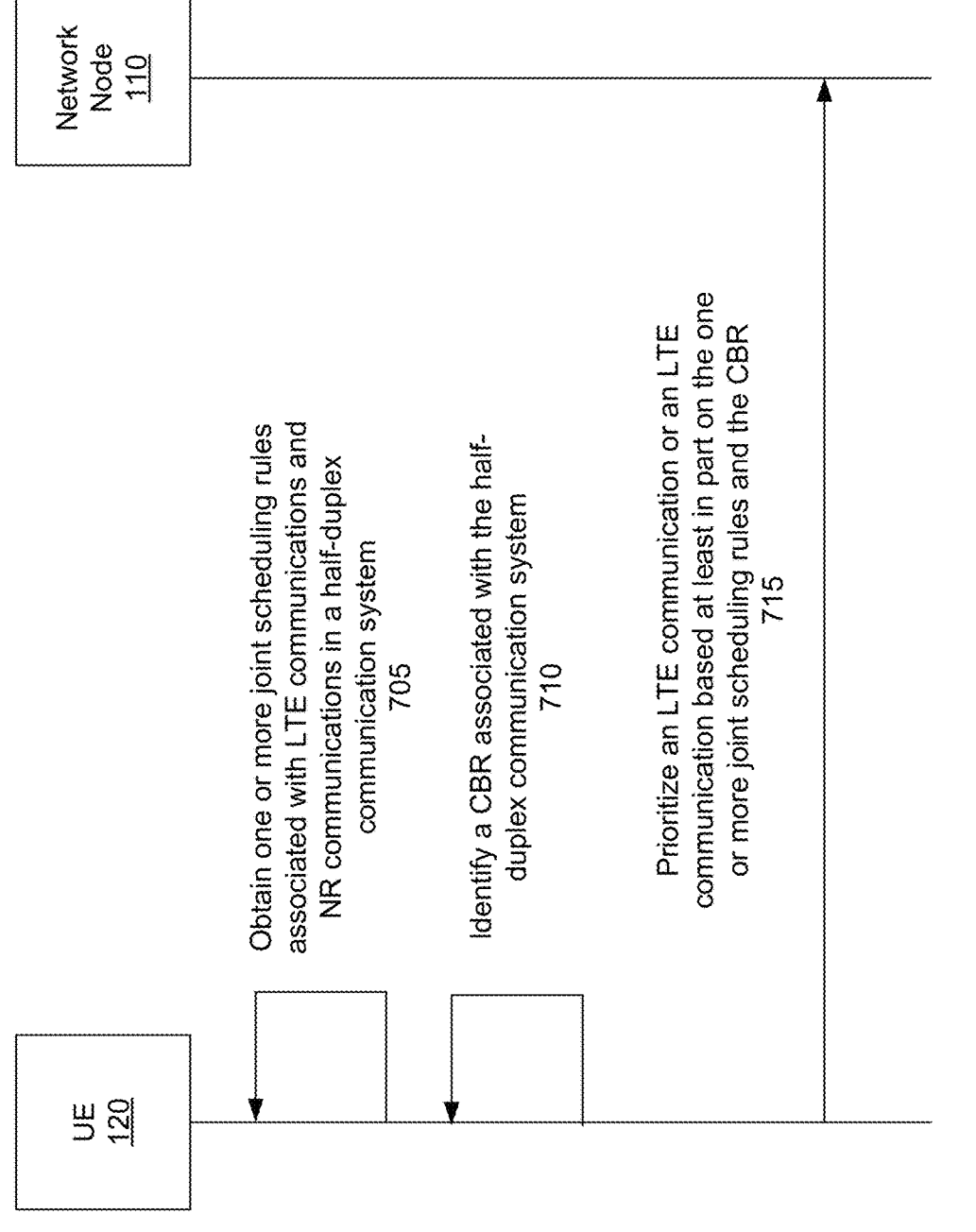
FIG. 7 is a diagram illustrating an example of concurrent transmission scheduling, in accordance with the present disclosure.

FIG. 7 is a diagram illustrating an example 700 of concurrent transmission scheduling, in accordance with the present disclosure. The UE 120 may communicate with the network node 110. The network node 110 may be the CU 310, the DU 330, or the RU 340, among other examples. In some aspects, the network node 110 may be another UE or may be included in another UE. For example, the UE 120 may be a first vehicle (such as the vehicle 405-1) and the network node 110 may be another vehicle (such as the vehicle 405-2). The UE 120 and the network node 110 may communicate using LTE V2X communications or NR V2X communications, among other examples. The V2X communications may be cellular V2X (C-V2X) communications.

As shown by reference number 705, the UE 120 may obtain one or more joint scheduling rules associated with LTE communications and NR communications in a half-duplex communication system. The UE 120 may obtain the one or more joint scheduling rules based at least in part on an overlap between an LTE communication (such as an LTE transmission) and an NR communication (such as an NR transmission). The one or more joint scheduling rules may indicate to prioritize the LTE communication or the NR communication based at least in part on a CBR associated with the half-duplex communication system.

As shown by reference number 710, the UE 120 may identify a CBR associated with the half-duplex communication system. The CBR associated with the half-duplex communication system may be used by the UE 120 to determine a priority for performing the LIE communication or the NR communication.

As shown by reference number 715, the UE 120 may prioritize the LTE communication or the NR communication based at least in part on the one or more joint scheduling rules and the CBR. As described herein, when a transmission is performed using either of the V2X technologies (LIE V2X or NR V2X), receptions for both of the V2X technologies may be restricted due to the half-duplex nature of the communication system. Any reception resources overlapping in time with the transmission resources may be excluded by a channel sensing algorithm on both technologies. In this case, joint scheduling and mutually aware scheduling decisions may be needed to eliminate the probability of transmission resources overlapping for the two V2X technologies (e.g., using resource reselection (SPS), non-SPS scheduling, periodic physical sidelink feedback channel (PSFCH) in NR, or sidelink synchronization signal (SLSS) slots, among other examples).

In some aspects, the one or more prioritization rules may indicate to prioritize the LIE communication or the NR communication based at least in part on the CBR of the half-duplex communication system. The one or more joint scheduling rules may indicate a plurality of CBR thresholds, such as a low CBR threshold and a high CBR threshold. In one example, the low CBR threshold may be 0.3 and the high CBR threshold may be 0.8. However, other threshold values may be used. Additionally, or alternatively, different numbers of thresholds may be used. For example, a single CBR threshold may be used, or three CBR thresholds may be used, among other examples.

In a first example, the UE 120 may identify that the CBR associated with the half-duplex communication system does not satisfy the low CBR threshold. For example, the UE 120 may determine that the CBR associated with the half-duplex communication system is less than, or less than or equal to, 0.3. In this example, there may be enough free resources on both channels to allow for a TDM transmission that uses both of the V2X technologies. For example, the LTE communication and the NR communication may be multiplexed (using TDM) for transmission scheduling with little or no dropping of SPS reception traffic. The UE 120 may perform the TDM transmission assuming that there is a jointly-free transmission resource selection across the two V2X technologies.

In a second example, the UE 120 may identify that the CBR associated with the half-duplex communication system satisfies the low CBR threshold but does not satisfy the high CBR threshold. For example, the UE 120 may determine that the CBR associated with the half-duplex system is greater than, or greater than or equal to, 0.3, bus is less than, or less than or equal to, 0.8. In this example, there may be not enough free resources on both channels to minimize or eliminate dropped receptions. In some aspects, safety-related communications may be given a higher priority than non-safety related communications.

In some aspects, a safety-related LTE-V2X reception may be given priority over a non-safety-related NR-V2X reception. The safety-related LTE-V2X reception may be given the higher priority than the non-safety related NR-V2X reception by imposing different free resource classification thresholds for the LTE communications and the NR communications (e.g., based at least in part on an RSSI measurement or an RSRP measurement, among other examples). The different free resource classification thresholds may be used to extend NR free resource pools in order to move NR transmission scheduling away from occupied resources on the LTE-V2X. This may allow a controlled technology TDM operation with prioritization.

In some aspects, a safety-related NR-V2X reception may be given priority over a non-safety-related LTE-V2X reception. The safety-related LTE-V2X reception may be given the higher priority than the non-safety related LTE-V2X reception by imposing different free resource classification thresholds for the NR communications and the LTE communications (e.g., based at least in part on an RSSI measurement or an RSRP measurement, among other examples). The different free resource classification thresholds may be used to extend LTE free resource pools in order to move LTE transmission scheduling away from occupied resources on the NR-V2X. This may allow a controlled technology TDM operation with prioritization.

In a third example, the UE 120 may identify that the CBR associated with the half-duplex communication system satisfies the high CBR threshold. For example, the UE 120 may determine that the CBR associated with the half-duplex system is greater than, or greater than or equal to, 0.8.

In some aspects, the UE 120 may be required to drop (or delay) some NR traffic (transmissions and/or receptions) by giving priority to safety-related LTE-V2X communications. NR transmission dropping (or delaying) may be performed in advance based at least in part on a scheduling level. In some aspects, NR PSFCH transmission scheduling may be performed only during a second LTE-V2X slot. This may increase the probability that a partially overlapping reception LTE-V2X packet is not lost even with a last symbol erasure due to the NR transmission.

In some aspects, the UE 120 may be required to drop (or delay) some LTE traffic (transmissions and/or receptions) by giving priority to safety-related NR-V2X communications. LIE transmission dropping (or delaying) may be performed in advance based at least in part on a scheduling level. In some aspects, LTE PSFCH transmission scheduling may be performed only during a second NR-V2X slot. This may increase the probability that a partially overlapping reception NR-V2X packet is not lost even with a last symbol erasure due to the LTE transmission.

As described above, arbitration may be required to select only one specific V2X technology to transmit at a given time if both V2X technologies are attempting to schedule transmissions using the same resources or using resources that overlap in time. However, current arbitration methods are not sufficient for selecting between the V2X technologies to reduce or eliminate concurrent transmissions. This may result in an increased number of dropped communications. The techniques and apparatuses described herein may reduce the number of dropped communications based at least in part on transmission scheduling using LTE V2X and NR V2X. The techniques and apparatuses described herein may provide a number of advantages, such as a simpler design and a performance gain with reduced hardware and implementation constraints. For example, there may be less reception traffic dropping for concurrent V2X technologies (and/or better transmission and reception joint TDM across both V2X technologies), no dropping for LTE-V2X critical safety messages coming from a closed environment (LTE-V2X SPS transmissions may be prioritized by a joint scheduler), and fewer transmission droppings across both V2X technologies due to TDM transmission constraints (avoiding transmission collisions by joint transmission resource selection across the V2X technologies).

As indicated above, FIG. 7 is provided as an example. Other examples may differ from what is described with respect to FIG. 7.

In some cases, the vehicle 605 may include two antennas such as the first antenna 610-1 and the second antenna 610-2. The first antenna 610-1 and the second antenna 610-2 may be configured to perform communications using dedicated short range communications (DSRC) and/or NR V2X.

In some cases, different automotive technologies such as DSRC and NR V2X may be deployed on different channels in an ITS band. A V2X transceiver may need to support the different automotive technologies concurrently for both transmission and reception. For automotive products, there may be two antennas (such as antennas 610-1 and 610-2) that are shared for transmission and reception and for the different concurrent technologies. This may be due, for example, to the high cost of cabling on the car platform and to poor isolation between the antennas. In some cases, the half-duplex nature of V2X technology may be due to the restriction of the shared antennas for transmission and reception in V2X. For example, once there is a transmission using any of the V2X technologies from any one of the antennas 610, there may be no reception for all of the V2X technologies on all of the antennas 610.

In some cases, each of the automotive technologies (DSRC and NR-V2X) may select transmission resources independently using autonomous channel sensing (for the channel where the respective technology is deployed), SPS transmission scheduling (in the case of NR-V2X), or carrier sense multiple access with collision avoidance (CSMA/CA) with clear channel assessment (CCA) (in the case of DSRC) to avoid channel collisions. In some cases, the autonomous scheduling processes of each respective automotive technology may search for available resources for transmission scheduling only on the channel that is associated with that automotive technology. If both of the automotive technologies select transmission resources independently, there is a likelihood that some portion of reception traffic (from the other automotive technology) will be dropped. In some cases, a joint or mutually aware transmission decision, resource selection, and transmission scheduling or access may be used to minimize the potential dropping of reception traffic due to the half-duplex limitations in conjunction with the concurrent automotive technology support requirement. However, this type of cross-technology synergy and coordination may not be possible in the case of DSRC and V2X technology combinations.

C-V2X is a synchronized technology that uses autonomous SPS scheduling that is based at least in part on channel sensing. A C-V2X scheduling algorithm may account for the half-duplex restriction of communications to minimize C-V2X reception traffic dropping. In contrast, DSRC is a non-synchronized technology where channel access is contention-based and relies on a CSMA/CA algorithm with CCA to avoid or minimize collisions on the shared channel. Correspondingly, there may be no transmission scheduling on a specific time resource that is predefined in advance according to some criteria. Instead, in the case of DSRC, there may be an asynchronous or non-predictable contention-based channel access which is based at least in part on an enhanced distributed channel access (EDCA) algorithm that allows QoS (e.g., prioritization or differentiation of channel access for different messages, traffic types, or priorities). EDCA is an advanced version of a distributed coordination function (DCF) that allows contention-based access with QoS (e.g., DCF with four priorities). DCF is a fundamental contention-based channel access method that is based at least in part on CSMA/CA but without QoS differentiation between different traffic or data types. EDCA may use different arbitration inter-frame space (AIFS) and contention window (CW) sizes for different access categories (ACs) or traffic priorities.

In some cases, CCA is based on physical channel sensing (CS) that includes RSSI measurements. These measurements may be driving the CCA status for EDCA. Since DSRC does not have a predictable (or controllable) in-advance transmission time (e.g., transmission timing is determined by EDCA channel access procedures that depend on other users via CCA), a joint scheduling solution to avoid transmission collisions across technologies cannot be applicable (for example, due to the combination of synchronous and non-synchronous technologies). In some cases, joint scheduling (e.g., as in case of LTE-V2X and NR-V2X concurrency) may mitigate or minimize both reception packet dropping due to half-duplex restrictions and transmission packet dropping due to transmission collisions or transmissions overlapping in time between the concurrent technologies. Some other options for multiplexing (e.g., using TDM) transmissions for concurrent DSRC and NR-V2X technologies may include delaying a DSRC transmission to avoid any transmission dropping due to an overlap (in time) between the DSRC transmission and an NR-V2X transmission, giving priority to DSRC transmissions that convey safety or other critical messages and dropping or delaying NR-V2X transmissions in the case of collision or overlap in time between the DSRC and NR-V2X transmissions, and giving priority to one of the technology transmissions based at least in part on transmission message priority (e.g., higher priority messages may be transmitted no matter which technology is being used and the other transmission may be dropped or delayed). Additional details are described below in connection with FIGS. 8-10.

Figure 8:
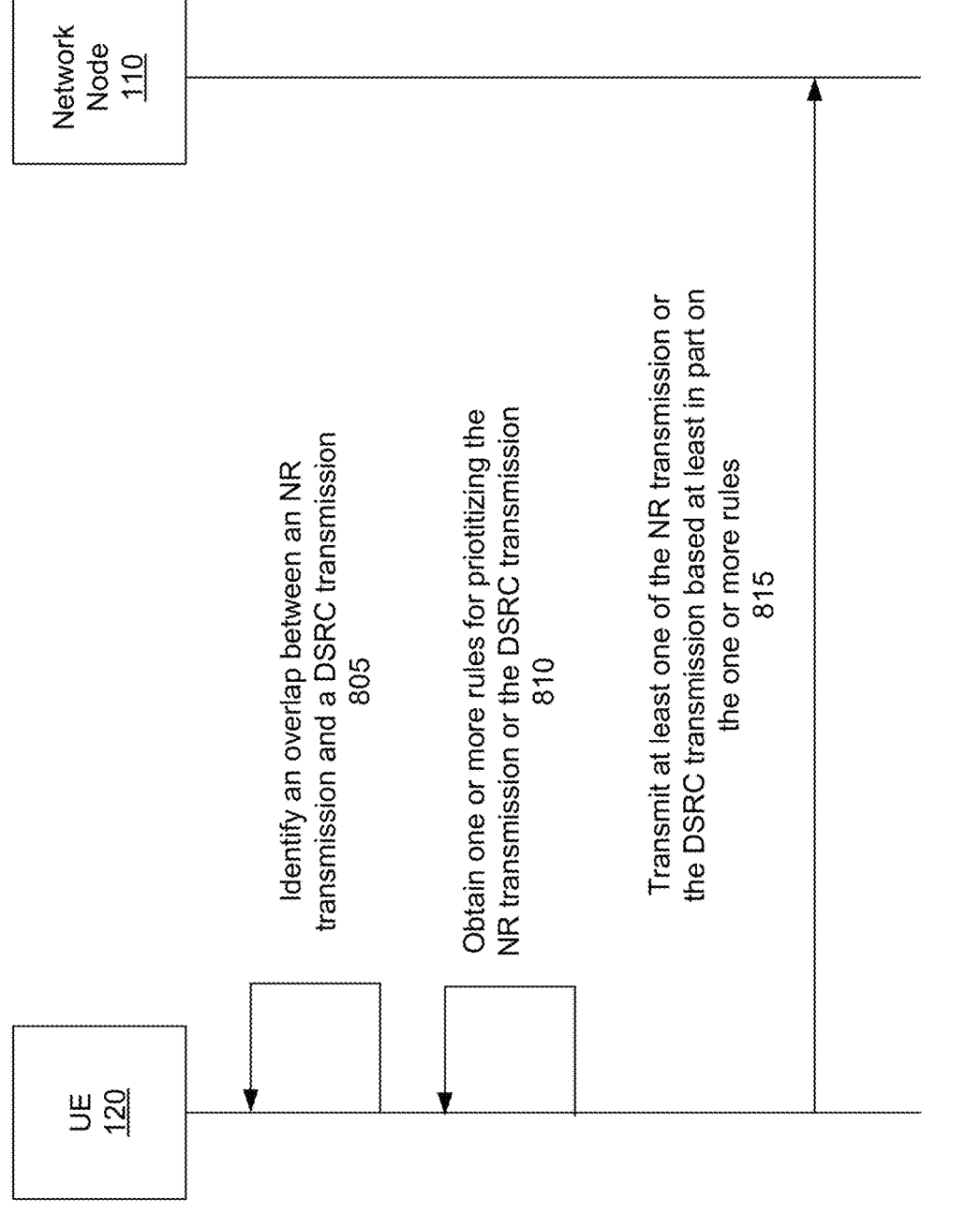
FIG. 8 is a diagram illustrating an example of concurrent transmission prioritization, in accordance with the present disclosure.

FIG. 8 is a diagram illustrating an example 800 of concurrent transmission prioritization, in accordance with the present disclosure. The UE 120 may communicate with the network node 110. The network node 110 may be the CU 310, the DU 330, or the RU 340, among other examples. In some aspects, the network node 110 may be another UE or may be included in another UE. For example, the UE 120 may be a first vehicle (such as the vehicle 405-1) and the network node 110 may be another vehicle (such as the vehicle 405-2). The UE 120 and the network node 110 may communicate using DSRC or NR-V2X communications, among other examples. The NR-V2X communications may be NR-C-V2X communications.

Giving priority to NR transmissions by delaying DSRC transmissions may result in less transmission dropping across both technologies (e.g., NR and DSRC). In some aspects, NR transmission times may be fixed. An NR transmission may either be transmitted or dropped in an example where priority is given to an overlapping DSRC transmission. However, there is no fixed transmission time for DSRC. Thus, a DSRC transmission may be delayed (instead of dropped) in an example where priority is given to an overlapping NR transmission.

The transmission duty cycle for V2X may be low (e.g., limited to 3%) and an effective NR transmission session duration may be limited. An effective NR transmission session duration bound (from the DSRC perspective with a TDM technology transmission constraint) may be equal to an NR transmission preparation time plus an NR transmission time plus a DSRC transmission time (e.g., NR Tx preparation time+NR Tx duration+DSRC Tx configuration time), which may be equal to 1.5+0.5+0.5=2.5 msec (assuming single slot transmission for NR). In some cases, NR scheduling may be performed three slots ahead of a transmission start time, and back-to-back transmission scheduling can be avoided or restricted in order to keep the DSRC highly latency bound. In some cases, a DSRC actual transmission time or latency may be based at least in part on CCA procedures and may be a function of the CBR. Some extra delay (e.g., relatively low delay) may not have an impact on the DSRC actual transmission time or latency.

As shown by reference number 805, the UE 120 may identify an overlap between an NR transmission and a DSRC transmission. The overlap between the NR transmission and the DSRC transmission may be a full overlap or may be a partial overlap. In some aspects, the NR transmission and the DSRC transmission may be multiplexed transmissions (e.g., using TDM).

As shown by reference number 810, the UE 120 may obtain one or more rules for prioritizing the NR transmission or the DSRC transmission based at least in part on the overlap between the NR transmission and the DSRC transmission. In some aspects, the UE 120 may prioritize the NR transmission. Additional details are described below.

As shown by reference number 815, the UE 120 may transmit at least one of the NR transmission or the DSRC transmission based at least in part on the one or more rules.

In a first example, the NR transmission may be scheduled prior to the DSRC transmission. In this example, an overlapping DSRC data transmission session may be delayed until the NR transmission is complete. The DSRC transmission session may include a DSRC transmission configuration latency portion, a CCA/channel contention portion, and a physical layer protocol data unit (PPDU) transmission duration portion.

When a DSRC medium access control service data unit (MSDU) packet enters an EDCA transmission queue and the NR transmission is already scheduled, the DSRC transmission configuration may not be performed. For example, the transmission path may be shared for both technologies, and the NR transmission may get priority over the DSRC transmission. The DSRC CCA may be delayed by imitating a "channel busy" condition for the DSRC channel access controller/EDCA (which may be disconnected from the actual CCA measurements in the physical layer) until the NR transmission is complete. The DSRC transmission may be configured after (e.g., immediately after) the NR transmission is complete. Once the NR transmission session is complete and the DSRC transmission is configured, the CCA may switch back to performing actual physical channel sensing and the DSRC transmission session may continue as usual.

A DSRC ACK transmission (e.g., for unicast reception packets) that overlaps with the effective time of the NR transmission session (NR Tx configuration+NR transmission slot+DSRC transmission configuration) may be dropped. The DSRC ACK transmission may be dropped based at least in part on an assumption that the DSRC ACK transmission cannot be delayed. Unicast messages may be a minority of communications on the DSRC channel, and the DSRC ACK duration and transmission start may be predictable once the unicast reception packet is received.

Additional details regarding these features are described in connection with FIG. 9.

In a second example, the DSRC transmission may be scheduled prior to the NR transmission. In the case of an NR transmission session that overlaps with the DSRC transmission, the ongoing DSRC transmission session or channel contention attempts may be stopped or delayed from the moment the NR transmission is scheduled and until NR transmission is complete. This may assume, for example, that a PPDU transmission has not yet been initiated.

The DSRC transmission session may be stopped or delayed based at least in part on imitating a "channel busy" condition for the DSRC channel access controller or scheduler (EDCA) until the NR transmission session is complete and the DSRC transmission is re-configured.

Once the NR transmission session is complete and the DSRC transmission is re-configured, the CCA may switch back to performing actual physical channel sensing, and the DSRC transmission session may continue as usual with the same enhanced digital channel access function (EDCAF) parameters (such as the same random access (RA) backoff (BO) counter value and codeword (CW) size, among other examples) as before the time that the DSRC transmission was stopped.

In some aspects, a DSRC ACK transmission (e.g., for unicast reception packets) that overlaps with the effective time of the NR transmission session (NR transmission configuration+NR transmission slot+DSRC transmission configuration) may be dropped. The DSRC ACK transmission may be dropped based at least in part on an assumption that the DSRC ACK transmission cannot be delayed.

In some aspects, there may be no active DSRC transmission or NR transmission stopping in the physical layer or MAC layer. If a DSRC PPDU transmission was already triggered by EDCA, then this transmission may be performed, and the NR transmission may be dropped, if the DSRC PPDU transmission duration overlaps with the NR transmission configuration slot. The PPDU transmission duration (e.g., at least one of the medium access control (MAC) protocol data unit (MPDU) header fields) may be known in advance to the transmitter.

Additional details regarding these features are described in connection with FIG. 10.

As indicated above, FIG. 8 is provided as an example. Other examples may differ from what is described with respect to FIG. 8.

Figure 9:
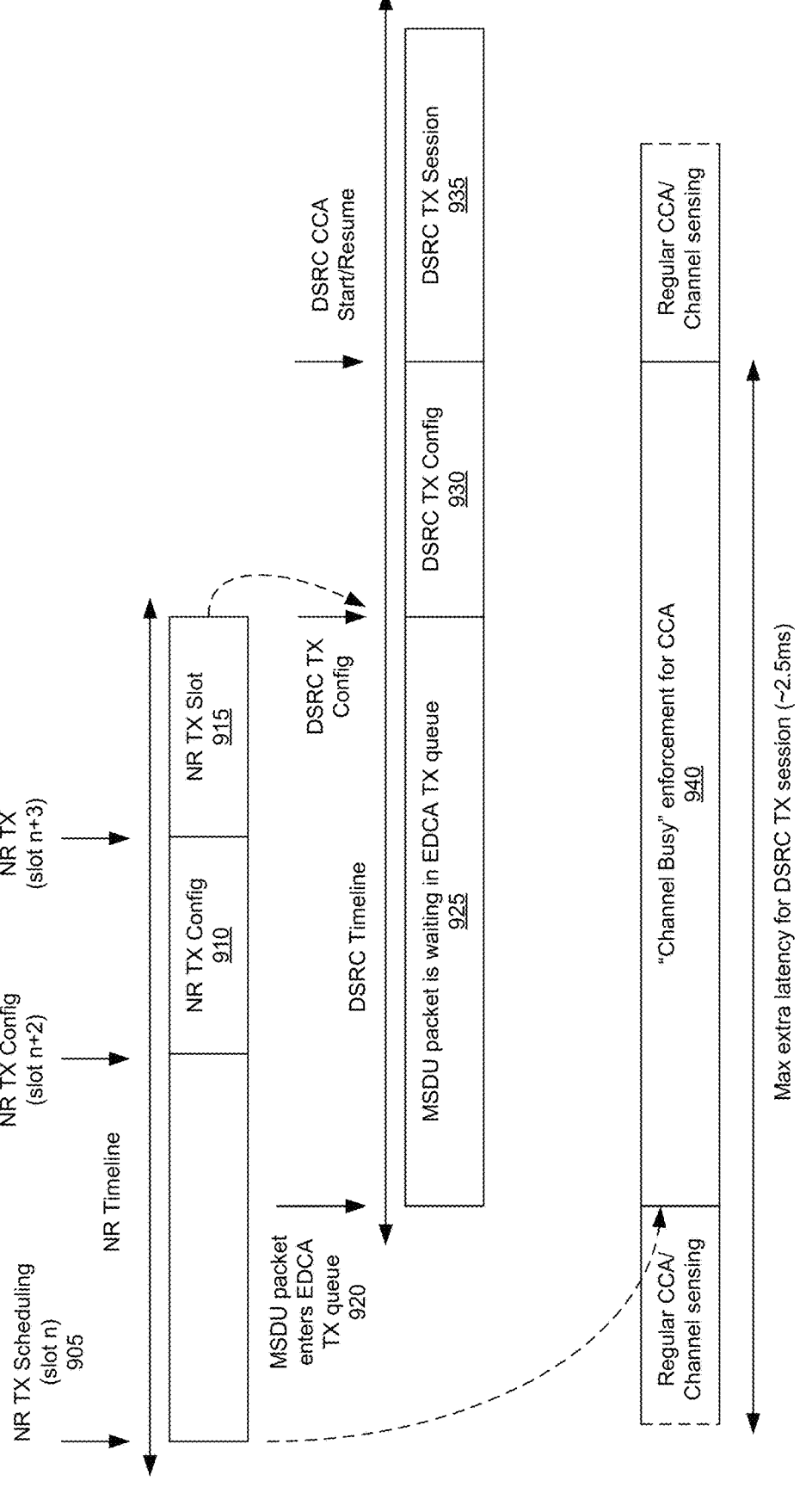
FIG. 9 is a diagram illustrating an example of overlapping dedicated short range communications (DSRC) and New Radio (NR) communications.

FIG. 9 is a diagram illustrating an example 900 of overlapping DSRC and NR communications. In some aspects, an NR transmission may be scheduled prior to a DSRC transmission. As shown by reference number 905, the NR transmission may be scheduled at slot n. The NR transmission configuration 910 may be scheduled at slot n+2, and the NR transmission slot 915 may be scheduled at slot n+3.

As shown by reference number 920, an MSDU packet associated with the DSRC transmission may enter an EDCA transmission queue after slot n. For example, the MSDU packet may enter the EDCA transmission queue after slot n but prior to slot n+2. As shown by reference number 925, the MSDU packet may be delayed in the EDCA transmission queue until after a completion of the NR transmission. A DSRC transmission configuration may be delayed based at least in part on the transmission path for the NR transmission and the DSRC transmission being shared, and the NR transmission being given priority. The DSRC CCA may be delayed based at least in part on imitating a "channel busy" condition (as shown by reference number 940) for the DSRC channel access controller or EDCA (which may be disconnected from the actual CCA measurements at the physical layer). The DSRC CCA may be delayed until the NR transmission session is complete, and the DSRC transmission may be configured after (e.g., immediately after) the NR transmission session is complete.

As shown by reference number 930, the DSRC transmission configuration may resume. The DSRC transmission configuration may resume based at least in part on the NR transmission session being complete. Once the NR transmission session is complete and the DSRC transmission is configured, the CCA may switch back to performing actual physical channel sensing and the DSRC transmission session may continue as usual. As shown by reference number 935, the DSRC transmission session may resume. In some aspects, a DSRC ACK transmission (for unicast packets) that overlaps with the effective time of the NR transmission session (NR transmission configuration+NR transmission slot+DSRC transmission configuration) may be dropped. The DSRC ACK transmission may be dropped based at least in part on an assumption that the DSRC ACK transmission cannot be delayed.

As indicated above, FIG. 9 is provided as an example. Other examples may differ from what is described with respect to FIG. 9.

Figure 10:
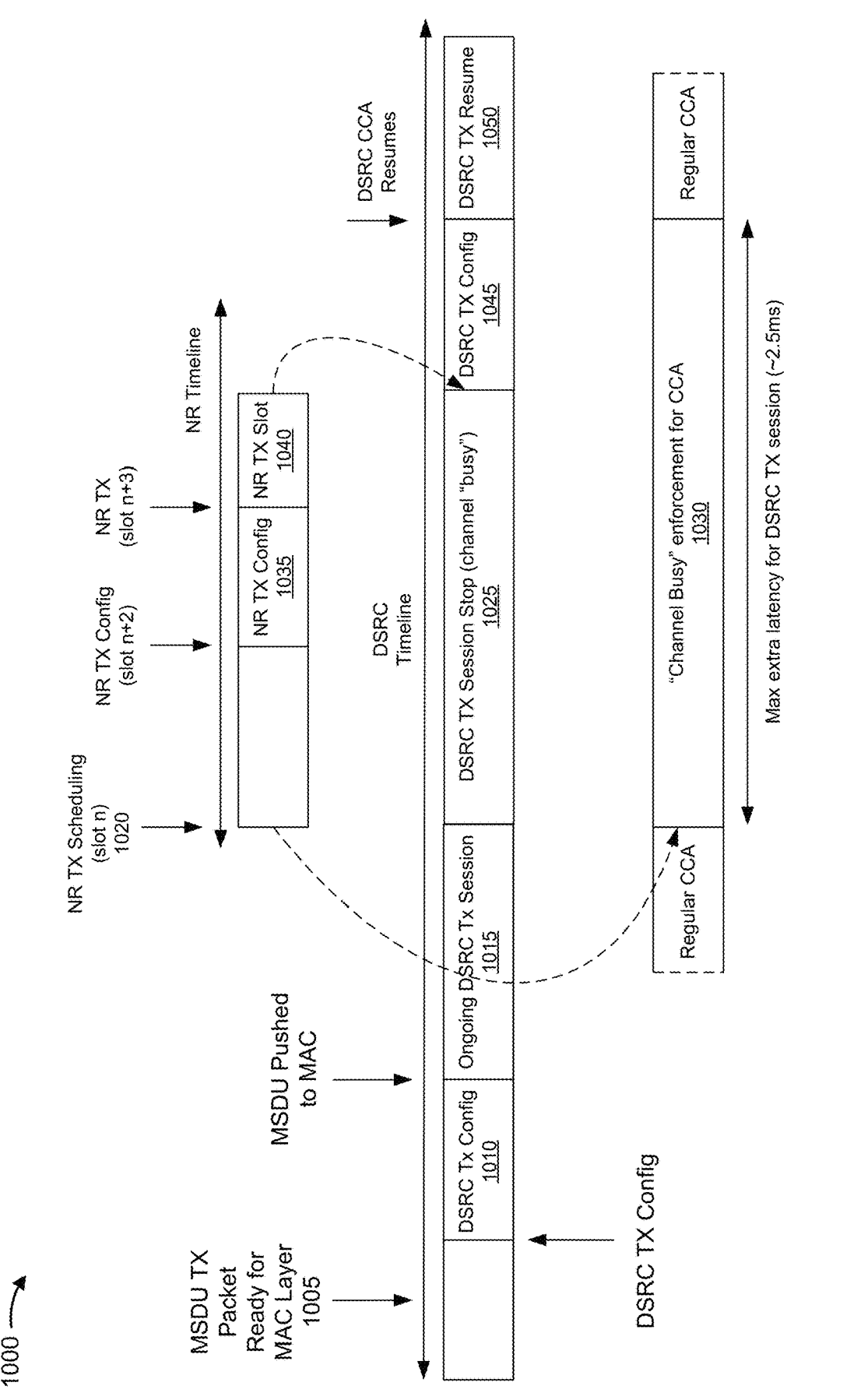
FIG. 10 is a diagram illustrating an example of overlapping DSRC and NR communications, in accordance with the present disclosure.

FIG. 10 is a diagram illustrating an example 1000 of overlapping DSRC and NR communications, in accordance with the present disclosure. As shown by reference number 1005, an MSDU packet (associated with the DSRC transmission) may be ready for the MAC layer. As shown by reference number 1010, the UE 120 may perform a DSRC transmission configuration. As shown by reference number 1015, the DSRC transmission session may be initiated and may be ongoing for a duration.

As shown by reference number 1020, NR transmission scheduling may occur at slot n. The NR transmission scheduling may overlap with the ongoing DSRC transmission session. As shown by reference number 1025, the DSRC transmission session/channel contention attempts may be stopped or delayed based at least in part on the NR transmission being scheduled and until the NR transmission session is complete. This may assume that the PPDU transmission has not yet been initiated.

As shown by reference number 1030, the DSRC transmission session may be stopped or delayed based at least in part on imitating a "channel busy" condition for the DSRC EDCA until the NR transmission session is complete. As shown by reference number 1035, the UE 120 may perform an NR transmission configuration at slot n+2. As shown by reference number 1040, the UE 120 may perform the NR transmission at slot n+3.

As shown by reference number 1045, the DSRC transmission may be configured based at least in part on a completion of the NR transmission. As shown by reference number 1050, once the NR transmission session is complete and the DSRC transmission is configured, the CCA may switch back to actual physical channel sensing and the UE 120 may continue the DSRC transmission session as usual with the same EDCAF parameters (such as the same random access (RA) backoff (BO) counter value and codeword (CW) size, among other examples) as before the time that the DSRC transmission was stopped. In some aspects, a DSRC ACK transmission (for unicast packets) that overlaps with the effective time of the NR transmission session (NR transmission configuration+NR transmission slot+DSRC transmission configuration) may be dropped. The DSRC ACK transmission may be dropped based at least in part on an assumption that the DSRC ACK transmission cannot be delayed.

In some aspects, if the DSRC PPDU transmission was already triggered by the EDCA (e.g., prior to the NR transmission scheduling at slot n), then the DSRC transmission may be performed, and the NR transmission may be dropped, if the PPDU transmission overlaps with the NR transmission configuration slot 1035. The PPDU transmission duration (e.g., at least one of MPDU header fields) may be known in advance to the transmitter.

As indicated above, FIG. 10 is provided as an example. Other examples may differ from what is described with respect to FIG. 10.

FIG. 11 is a diagram illustrating an example process 1100 performed, for example, by a UE, in accordance with the present disclosure. Example process 1100 is an example where the UE (e.g., UE 120) performs operations associated with concurrent transmission scheduling and prioritization.

As shown in FIG. 11, in some aspects, process 1100 may include obtaining one or more joint scheduling rules associated with LTE communications and NR communications in a half-duplex communication system (block 1110). For example, the UE (e.g., using communication manager 140 and/or obtaining component 1308, depicted in FIG. 13) may obtain one or more joint scheduling rules associated with LTE communications and NR communications in a half-duplex communication system, as described above.

As further shown in FIG. 11, in some aspects, process 1100 may include identifying a CBR associated with the half-duplex communication system (block 1120). For example, the UE (e.g., using communication manager 140 and/or identifying component 1310, depicted in FIG. 13) may identify a CBR associated with the half-duplex communication system, as described above.

As further shown in FIG. 11, in some aspects, process 1100 may include prioritizing an LTE communication or an NR communication based at least in part on the one or more joint scheduling rules and the CBR (block 1130). For example, the UE (e.g., using communication manager 140 and/or prioritizing component 1312, depicted in FIG. 13) may prioritize an LTE communication or an NR communication based at least in part on the one or more joint scheduling rules and the CBR, as described above.

Process 1100 may include additional aspects, such as any single aspect or any combination of aspects described below and/or in connection with one or more other processes described elsewhere herein.

In a first aspect, at least one of the LTE communication and the NR communication is a V2X communication.

In a second aspect, alone or in combination with the first aspect, the LTE communication is a cellular V2X communication and the NR communication is another cellular V2X communication.

In a third aspect, alone or in combination with one or more of the first and second aspects, identifying the CBR associated with the half-duplex communication system comprises determining that the CBR associated with the half-duplex communication system does not satisfy a low CBR threshold.

In a fourth aspect, alone or in combination with one or more of the first through third aspects, the one or more joint scheduling rules indicate to combine the LTE communication and the NR communication using a time division multiplexing (TDM) operation based at least in part on the CBR associated with the half-duplex communication system not satisfying the low CBR threshold.

In a fifth aspect, alone or in combination with one or more of the first through fourth aspects, process 1100 includes transmitting the LTE communication and the NR communication using the TDM operation based at least in part on the one or more joint scheduling rules.

In a sixth aspect, alone or in combination with one or more of the first through fifth aspects, further comprising identifying a jointly free transmission resource selection across the LIE communications and the NR communications in the half-duplex communication system.

In a seventh aspect, alone or in combination with one or more of the first through sixth aspects, identifying the CBR associated with the half-duplex communication system comprises determining that the CBR associated with the half-duplex communication system satisfies a low CBR threshold but does not satisfy a high CBR threshold.

In an eighth aspect, alone or in combination with one or more of the first through seventh aspects, the one or more joint scheduling rules indicate to prioritize a safety-related communication over a non-safety-related communication.

In a ninth aspect, alone or in combination with one or more of the first through eighth aspects, prioritizing the LTE communication or the NR communication comprises prioritizing an LTE reception based at least in part on the LTE reception being a safety-related reception or a high priority reception.

In a tenth aspect, alone or in combination with one or more of the first through ninth aspects, prioritizing the LTE reception comprises extending one or more resources from an NR free resource pool to enable a time division multiplexing operation that indicates to prioritize the LTE reception.

In an eleventh aspect, alone or in combination with one or more of the first through tenth aspects, prioritizing the LTE communication or the NR communication comprises prioritizing an NR reception based at least in part on the NR reception being a safety-related reception or a high priority reception.

In a twelfth aspect, alone or in combination with one or more of the first through eleventh aspects, prioritizing the NR reception comprises extending one or more resources from an LTE free resource pool to enable a time division multiplexing operation that indicates to prioritize the NR reception.

In a thirteenth aspect, alone or in combination with one or more of the first through twelfth aspects, identifying the CBR associated with the half-duplex communication system comprises determining that the CBR associated with the half-duplex communication system satisfies a high CBR threshold.

In a fourteenth aspect, alone or in combination with one or more of the first through thirteenth aspects, the CBR associated with the half-duplex communication system satisfying the high CBR threshold indicates a high traffic congestion condition for both of the LTE communications and the NR communications.

In a fifteenth aspect, alone or in combination with one or more of the first through fourteenth aspects, prioritizing the LTE communication or the NR communication comprises prioritizing an LTE reception, and dropping or delaying the NR communication, based at least in part on the LTE reception being a safety-related reception or a high priority reception.

In a sixteenth aspect, alone or in combination with one or more of the first through fifteenth aspects, dropping or delaying the NR communication comprises dropping or delaying the NR communication in advance of the NR communication and based at least in part on a scheduling indication.

In a seventeenth aspect, alone or in combination with one or more of the first through sixteenth aspects, dropping or delaying the NR communication comprises dropping or delaying an NR transmission and an NR reception.

In an eighteenth aspect, alone or in combination with one or more of the first through seventeenth aspects, prioritizing the LTE communication or the NR communication comprises prioritizing an NR reception, and dropping or delaying the LTE communication, based at least in part on the NR reception being a safety-related reception or a high priority reception.

In a nineteenth aspect, alone or in combination with one or more of the first through eighteenth aspects, dropping or delaying the LTE communication comprises dropping or delaying the LTE communication in advance of the LTE communication and based at least in part on a scheduling indication.

In a twentieth aspect, alone or in combination with one or more of the first through nineteenth aspects, dropping or delaying the LTE communication comprises dropping or delaying an LTE transmission and an LTE reception.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a UE, in accordance with the present disclosure. Example process 1200 is an example where the UE (e.g., UE 120) performs operations associated with concurrent transmission scheduling and prioritization.

As shown in FIG. 12, in some aspects, process 1200 may include identifying an overlap between an NR transmission and a DSRC transmission (block 1210). For example, the UE (e.g., using communication manager 140 and/or identifying component 1310, depicted in FIG. 13) may identify an overlap between an NR transmission and a DSRC transmission, as described above.

As further shown in FIG. 12, in some aspects, process 1200 may include obtaining one or more rules for prioritizing the NR transmission or the DSRC transmission based at least in part on the overlap between the NR transmission and the DSRC transmission (block 1220). For example, the UE (e.g., using communication manager 140 and/or prioritizing component 1312, depicted in FIG. 13) may obtain one or more rules for prioritizing the NR transmission or the DSRC transmission based at least in part on the overlap between the NR transmission and the DSRC transmission, as described above.

As further shown in FIG. 12, in some aspects, process 1200 may include transmitting at least one of the NR transmission or the DSRC transmission based at least in part on the one or more rules (block 1230). For example, the UE (e.g., using communication manager 140 and/or transmission component 1304, depicted in FIG. 13) may transmit at least one of the NR transmission or the DSRC transmission based at least in part on the one or more rules, as described above.

Process 1200 may include additional aspects, such as any single aspect or any combination of aspects described below and/or in connection with one or more other processes described elsewhere herein.

In a first aspect, the overlap between the NR transmission and the DSRC transmission is at least a partial overlap between an NR transmission session that includes the NR transmission and a DSRC transmission session that includes the DSRC transmission.

In a second aspect, alone or in combination with the first aspect, the NR transmission is a cellular vehicle-to-everything transmission.

In a third aspect, alone or in combination with one or more of the first and second aspects, the NR transmission and the DSRC transmission are time division multiplexed transmissions.

In a fourth aspect, alone or in combination with one or more of the first through third aspects, the NR transmission is associated with a fixed transmission time and the DSRC transmission is not associated with a fixed transmission time, and the DSRC transmission is capable of being delayed but the NR transmission is not capable of being delayed.

In a fifth aspect, alone or in combination with one or more of the first through fourth aspects, the one or more rules indicate that the NR transmission is to be prioritized over the DSRC transmission.

In a sixth aspect, alone or in combination with one or more of the first through fifth aspects, the NR transmission is scheduled prior to the DSRC transmission.

In a seventh aspect, alone or in combination with one or more of the first through sixth aspects, process 1200 includes delaying a DSRC transmission session that includes the DSRC transmission until the NR transmission is complete.

In an eighth aspect, alone or in combination with one or more of the first through seventh aspects, process 1200 includes obtaining an indication that a DSRC MSDU packet has entered an EDCA transmission queue, obtaining an indication that an NR transmission session that includes the NR transmission is in progress, and delaying a DSRC CCA process based at least in part on imitating a channel busy condition for a DSRC channel access controller or an EDCA scheduler until the NR transmission is complete.

In a ninth aspect, alone or in combination with one or more of the first through eighth aspects, process 1200 includes performing a DSRC transmission configuration based at least in part on a completion of the NR transmission.

In a tenth aspect, alone or in combination with one or more of the first through ninth aspects, process 1200 includes switching the CCA process to a physical channel sensing mode, and initiating the DSRC transmission session, based at least in part on the completion of the NR transmission.

In an eleventh aspect, alone or in combination with one or more of the first through tenth aspects, process 1200 includes dropping a DSRC acknowledgement transmission that overlaps with an effective time of the NR transmission session.

In a twelfth aspect, alone or in combination with one or more of the first through eleventh aspects, the DSRC acknowledgement transmission is associated with a unicast reception.

In a thirteenth aspect, alone or in combination with one or more of the first through twelfth aspects, the DSRC transmission is scheduled prior to the NR transmission.

In a fourteenth aspect, alone or in combination with one or more of the first through thirteenth aspects, process 1200 includes stopping an ongoing DSRC transmission session, delaying the ongoing DSRC transmission session, or allowing the ongoing DSRC transmission session and delaying a future DSRC transmission session based at least in part on the DSRC transmission session overlapping with an NR transmission session that includes the NR transmission.

In a fifteenth aspect, alone or in combination with one or more of the first through fourteenth aspects, stopping the ongoing DSRC transmission session, delaying the ongoing DSRC transmission session, or allowing the ongoing DSRC transmission session and delaying the future DSRC transmission session comprises imitating a channel busy condition for a DSRC channel access controller or an EDCA transmission scheduler until the NR transmission is complete.

In a sixteenth aspect, alone or in combination with one or more of the first through fifteenth aspects, process 1200 includes switching a CCA process to actual physical channel sensing, and continuing the DSRC transmission session, based at least in part on the NR transmission being complete.

In a seventeenth aspect, alone or in combination with one or more of the first through sixteenth aspects, continuing the DSRC transmission session comprises continuing the DSRC transmission session using the same EDCAF parameters as prior to the stopping or delaying of the DSRC transmission session.

In an eighteenth aspect, alone or in combination with one or more of the first through seventeenth aspects, process 1200 includes dropping a DSRC acknowledgement transmission that overlaps with an effective time of the NR transmission session.

In a nineteenth aspect, alone or in combination with one or more of the first through eighteenth aspects, the DSRC acknowledgement transmission is associated with a unicast reception.

In a twentieth aspect, alone or in combination with one or more of the first through nineteenth aspects, process 1200 includes dropping the NR transmission based at least in part on a DSRC physical layer PPDU being triggered prior to an NR transmission session that includes the NR transmission.

In a twenty-first aspect, alone or in combination with one or more of the first through twentieth aspects, the one or more rules indicate to prioritize the DSRC transmission based at least in part on the DSRC transmission being a particular type of transmission.

In a twenty-second aspect, alone or in combination with one or more of the first through twenty-first aspects, process 1200 includes transmitting the DSRC transmission and dropping the NR transmission based at least in part on the DSRC transmission being the particular type of transmission.

In a twenty-third aspect, alone or in combination with one or more of the first through twenty-second aspects, the particular type of transmission is a safety related transmission or a critical message related transmission.

In a twenty-fourth aspect, alone or in combination with one or more of the first through twenty-third aspects, the one or more rules indicate to prioritize the NR transmission or the DSRC transmission based at least in part on a priority of the NR transmission or the DSRC transmission.

In a twenty-fifth aspect, alone or in combination with one or more of the first through twenty-fourth aspects, process 1200 includes transmitting the NR transmission based at least in part on the NR transmission having a higher priority than the DSRC transmission, and dropping or delaying the DSRC transmission based at least in part on the DSRC transmission having a lower priority than the NR transmission.

In a twenty-sixth aspect, alone or in combination with one or more of the first through twenty-fifth aspects, process 1200 includes transmitting the DSRC transmission based at least in part on the DSRC transmission having a higher priority than the NR transmission, and dropping or delaying the NR transmission based at least in part on the NR transmission having a lower priority than the DSRC transmission.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
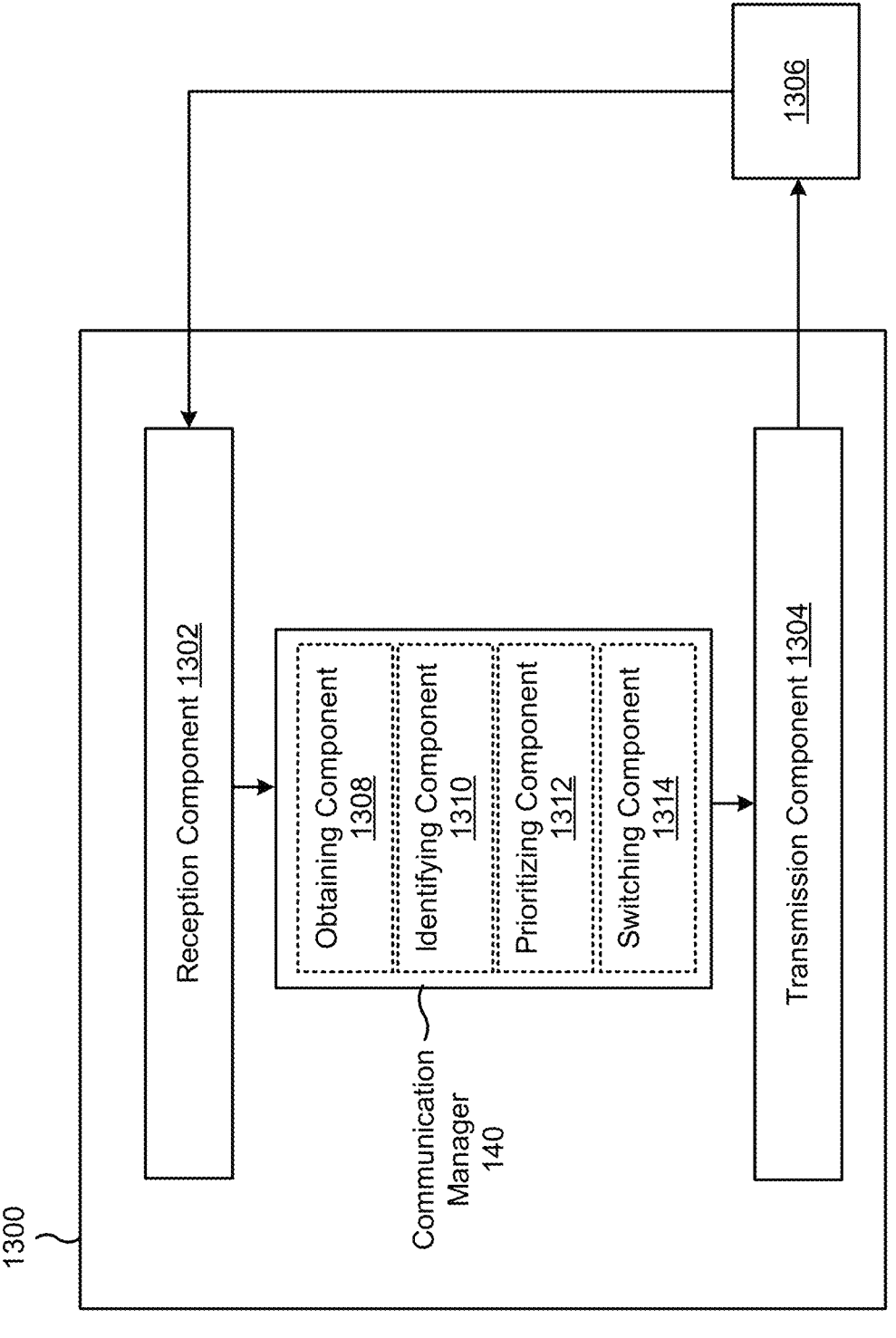
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of an obtaining component 1308, an identifying component 1310, a prioritizing component 1312, or a switching component 1314, among other examples.

In some aspects, the apparatus 1300 may be configured to perform one or more operations described herein in connection with FIGS. 7-10. Additionally, or alternatively, the apparatus 1300 may be configured to perform one or more processes described herein, such as process 1100 of FIG. 11, process 1200 of FIG. 12, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The obtaining component 1308 may obtain one or more joint scheduling rules associated with LTE communications and NR communications in a half-duplex communication system. The identifying component 1310 may identify a CBR associated with the half-duplex communication system. The prioritizing component 1312 may prioritize an LTE communication or an NR communication based at least in part on the one or more joint scheduling rules and the CBR. The transmission component 1304 may transmit the LTE communication and the NR communication using the TDM operation based at least in part on the one or more joint scheduling rules.

The identifying component 1310 may identify an overlap between an NR transmission and a DSRC transmission. The obtaining component 1308 may obtain one or more rules for prioritizing the NR transmission or the DSRC transmission based at least in part on the overlap between the NR transmission and the DSRC transmission. The transmission component 1304 may transmit at least one of the NR transmission or the DSRC transmission based at least in part on the one or more rules.

The prioritizing component 1312 may delay a DSRC transmission session that includes the DSRC transmission until the NR transmission is complete. The obtaining component 1308 may obtain an indication that a DSRC medium access control service data unit (MSDU) packet has entered an enhanced distributed channel access (EDCA) transmission queue. The obtaining component 1308 may obtain an indication that an NR transmission session that includes the NR transmission is in progress. The prioritizing component 1312 may delay a DSRC CCA process based at least in part on imitating a channel busy condition for a DSRC channel access controller or an EDCA scheduler until the NR transmission is complete. The transmission component 1304 may perform a DSRC transmission configuration based at least in part on a completion of the NR transmission. The switching component 1314 may switch the CCA process to a physical channel sensing mode, and initiate the DSRC transmission session, based at least in part on the completion of the NR transmission.

The prioritizing component 1312 may drop a DSRC acknowledgement transmission that overlaps with an effective time of the NR transmission session. The prioritizing component 1312 may stop an ongoing DSRC transmission session, delay the ongoing DSRC transmission session, or allow the ongoing DSRC transmission session and delay a future DSRC transmission session based at least in part on the DSRC transmission session overlapping with an NR transmission session that includes the NR transmission. The switching component 1314 may switch a clear channel assessment (CCA) process to actual physical channel sensing, and continue the DSRC transmission session, based at least in part on the NR transmission being complete. The prioritizing component 1312 may drop a DSRC acknowledgement transmission that overlaps with an effective time of the NR transmission session. The prioritizing component 1312 may drop the NR transmission based at least in part on a DSRC PPDU being triggered prior to an NR transmission session that includes the NR transmission. The transmission component 1304 may transmit the DSRC transmission and drop the NR transmission based at least in part on the DSRC transmission being the particular type of transmission. The transmission component 1304 may transmit the NR transmission based at least in part on the NR transmission having a higher priority than the DSRC transmission, and drop or delay the DSRC transmission based at least in part on the DSRC transmission having a lower priority than the NR transmission. The transmission component 1304 may transmit the DSRC transmission based at least in part on the DSRC transmission having a higher priority than the NR transmission, and drop or delay the NR transmission based at least in part on the NR transmission having a lower priority than the DSRC transmission.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: obtaining one or more joint scheduling rules associated with Long Term Evolution (LTE) communications and New Radio (NR) communications in a half-duplex communication system; identifying a channel busy ratio (CBR) associated with the half-duplex communication system; and prioritizing an LTE communication or an NR communication based at least in part on the one or more joint scheduling rules and the CBR.

Aspect 2: The method of Aspect 1, wherein at least one of the LTE communication and the NR communication is a vehicle-to-everything (V2X) communication.

Aspect 3: The method of Aspect 2, wherein the LTE communication is a cellular V2X communication and the NR communication is another cellular V2X communication.

Aspect 4: The method of any of Aspects 1-3, wherein identifying the CBR associated with the half-duplex communication system comprises determining that the CBR associated with the half-duplex communication system does not satisfy a low CBR threshold.

Aspect 5: The method of Aspect 4, wherein the one or more joint scheduling rules indicate to combine the LTE communication and the NR communication using a time division multiplexing (TDM) operation based at least in part on the CBR associated with the half-duplex communication system not satisfying the low CBR threshold.

Aspect 6: The method of Aspect 5, further comprising transmitting the LTE communication and the NR communication using the TDM operation based at least in part on the one or more joint scheduling rules.

Aspect 7: The method of Aspect 5, wherein further comprising identifying a jointly free transmission resource selection across the LTE communications and the NR communications in the half-duplex communication system.

Aspect 8: The method of any of Aspects 1-7, wherein identifying the CBR associated with the half-duplex communication system comprises determining that the CBR associated with the half-duplex communication system satisfies a low CBR threshold but does not satisfy a high CBR threshold.

Aspect 9: The method of Aspect 8, wherein the one or more joint scheduling rules indicate to prioritize a safety-related communication over a non-safety-related communication.

Aspect 10: The method of Aspect 9, wherein prioritizing the LTE communication or the NR communication comprises prioritizing an LTE reception based at least in part on the LIE reception being a safety-related reception or a high priority reception.

Aspect 11: The method of Aspect 10, wherein prioritizing the LTE reception comprises extending one or more resources from an NR free resource pool to enable a time division multiplexing operation that indicates to prioritize the LTE reception.

Aspect 12: The method of Aspect 9, wherein prioritizing the LTE communication or the NR communication comprises prioritizing an NR reception based at least in part on the NR reception being a safety-related reception or a high priority reception.

Aspect 13: The method of Aspect 12, wherein prioritizing the NR reception comprises extending one or more resources from an LTE free resource pool to enable a time division multiplexing operation that indicates to prioritize the NR reception.

Aspect 14: The method of any of Aspects 1-13, wherein identifying the CBR associated with the half-duplex communication system comprises determining that the CBR associated with the half-duplex communication system satisfies a high CBR threshold.

Aspect 15: The method of Aspect 14, wherein the CBR associated with the half-duplex communication system satisfying the high CBR threshold indicates a high traffic congestion condition for both of the LTE communications and the NR communications.

Aspect 16: The method of Aspect 14, wherein prioritizing the LTE communication or the NR communication comprises prioritizing an LTE reception, and dropping or delaying the NR communication, based at least in part on the LTE reception being a safety-related reception or a high priority reception.

Aspect 17: The method of Aspect 16, wherein dropping or delaying the NR communication comprises dropping or delaying the NR communication in advance of the NR communication and based at least in part on a scheduling indication.

Aspect 18: The method of Aspect 16, wherein dropping or delaying the NR communication comprises dropping or delaying an NR transmission and an NR reception.

Aspect 19: The method of Aspect 14, wherein prioritizing the LTE communication or the NR communication comprises prioritizing an NR reception, and dropping or delaying the LTE communication, based at least in part on the NR reception being a safety-related reception or a high priority reception.

Aspect 20: The method of Aspect 19, wherein dropping or delaying the LTE communication comprises dropping or delaying the LTE communication in advance of the LTE communication and based at least in part on a scheduling indication.

Aspect 21: The method of Aspect 19, wherein dropping or delaying the LTE communication comprises dropping or delaying an LTE transmission and an LTE reception.

Aspect 22: A method of wireless communication performed by a user equipment (UE), comprising: identifying an overlap between a New Radio (NR) transmission and a dedicated short-range communication (DSRC) transmission; obtaining one or more rules for prioritizing the NR transmission or the DSRC transmission based at least in part on the overlap between the NR transmission and the DSRC transmission; and transmitting at least one of the NR transmission or the DSRC transmission based at least in part on the one or more rules.

Aspect 23: The method of Aspect 22, wherein the overlap between the NR transmission and the DSRC transmission is at least a partial overlap between an NR transmission session that includes the NR transmission and a DSRC transmission session that includes the DSRC transmission.

Aspect 24: The method of any of Aspects 22-23, wherein the NR transmission is a cellular vehicle-to-everything transmission.

Aspect 25: The method of any of Aspects 22-24, wherein the NR transmission and the DSRC transmission are time division multiplexed transmissions.

Aspect 26: The method of any of Aspects 22-25, wherein the NR transmission is associated with a fixed transmission time and the DSRC transmission is not associated with a fixed transmission time, and wherein the DSRC transmission is capable of being delayed but the NR transmission is not capable of being delayed.

Aspect 27: The method of any of Aspects 22-26, wherein the one or more rules indicate that the NR transmission is to be prioritized over the DSRC transmission.

Aspect 28: The method of Aspect 27, wherein the NR transmission is scheduled prior to the DSRC transmission.

Aspect 29: The method of Aspect 28, further comprising delaying a DSRC transmission session that includes the DSRC transmission until the NR transmission is complete.

Aspect 30: The method of Aspect 29, further comprising: obtaining an indication that a DSRC medium access control service data unit (MSDU) packet has entered an enhanced distributed channel access (EDCA) transmission queue; obtaining an indication that an NR transmission session that includes the NR transmission is in progress; and delaying a DSRC clear channel assessment (CCA) process based at least in part on imitating a channel busy condition for a DSRC channel access controller or an EDCA scheduler until the NR transmission is complete.

Aspect 31: The method of Aspect 30, further comprising performing a DSRC transmission configuration based at least in part on a completion of the NR transmission.

Aspect 32: The method of Aspect 31, further comprising switching the CCA process to a physical channel sensing mode, and initiating the DSRC transmission session, based at least in part on the completion of the NR transmission.

Aspect 33: The method of Aspect 32, further comprising dropping a DSRC acknowledgement transmission that overlaps with an effective time of the NR transmission session.

Aspect 34: The method of Aspect 33, wherein the DSRC acknowledgement transmission is associated with a unicast reception.

Aspect 35: The method of Aspect 28, wherein the DSRC transmission is scheduled prior to the NR transmission.

Aspect 36: The method of Aspect 35, further comprising stopping an ongoing DSRC transmission session, delaying the ongoing DSRC transmission session, or allowing the ongoing DSRC transmission session and delaying a future DSRC transmission session based at least in part on the DSRC transmission session overlapping with an NR transmission session that includes the NR transmission.

Aspect 37: The method of Aspect 36, wherein stopping the ongoing DSRC transmission session, delaying the ongoing DSRC transmission session, or allowing the ongoing DSRC transmission session and delaying the future DSRC transmission session comprises imitating a channel busy condition for a DSRC channel access controller or an enhanced distributed channel access (EDCA) transmission scheduler until the NR transmission is complete.

Aspect 38: The method of Aspect 36, further comprising switching a clear channel assessment (CCA) process to actual physical channel sensing, and continuing the DSRC transmission session, based at least in part on the NR transmission being complete.

Aspect 39: The method of Aspect 38, wherein continuing the DSRC transmission session comprises continuing the DSRC transmission session using the same enhanced digital channel access function (EDCAF) parameters as prior to the stopping or delaying of the DSRC transmission session.

Aspect 40: The method of Aspect 38, further comprising dropping a DSRC acknowledgement transmission that overlaps with an effective time of the NR transmission session.

Aspect 41: The method of Aspect 40, wherein the DSRC acknowledgement transmission is associated with a unicast reception.

Aspect 42: The method of Aspect 35, further comprising dropping the NR transmission based at least in part on a DSRC physical layer protocol data unit (PPDU) being triggered prior to an NR transmission session that includes the NR transmission.

Aspect 43: The method of any of Aspects 22-42, wherein the one or more rules indicate to prioritize the DSRC transmission based at least in part on the DSRC transmission being a particular type of transmission.

Aspect 44: The method of Aspect 43, further comprising transmitting the DSRC transmission and dropping the NR transmission based at least in part on the DSRC transmission being the particular type of transmission.

Aspect 45: The method of Aspect 43, wherein the particular type of transmission is a safety related transmission or a critical message related transmission.

Aspect 46: The method of any of Aspects 22-45, wherein the one or more rules indicate to prioritize the NR transmission or the DSRC transmission based at least in part on a priority of the NR transmission or the DSRC transmission.

Aspect 47: The method of Aspect 46, further comprising transmitting the NR transmission based at least in part on the NR transmission having a higher priority than the DSRC transmission, and dropping or delaying the DSRC transmission based at least in part on the DSRC transmission having a lower priority than the NR transmission.

Aspect 48: The method of Aspect 46, further comprising transmitting the DSRC transmission based at least in part on the DSRC transmission having a higher priority than the NR transmission, and dropping or delaying the NR transmission based at least in part on the NR transmission having a lower priority than the DSRC transmission.

Aspect 49: An apparatus for wireless communication at a device, comprising a processor; memory coupled with the processor; and instructions stored in the memory and executable by the processor to cause the apparatus to perform the method of one or more of Aspects 1-48.

Aspect 50: A device for wireless communication, comprising a memory and one or more processors coupled to the memory, the one or more processors configured to perform the method of one or more of Aspects 1-48.

Aspect 51: An apparatus for wireless communication, comprising at least one means for performing the method of one or more of Aspects 1-48.

Aspect 52: A non-transitory computer-readable medium storing code for wireless communication, the code comprising instructions executable by a processor to perform the method of one or more of Aspects 1-48.

Aspect 53: A non-transitory computer-readable medium storing a set of instructions for wireless communication, the set of instructions comprising one or more instructions that, when executed by one or more processors of a device, cause the device to perform the method of one or more of Aspects 1-48.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
   obtain one or more joint scheduling rules associated with Long Term Evolution (LTE) communications and New Radio (NR) communications in a half-duplex communication system;

identify a channel busy ratio (CBR) associated with the half-duplex communication system; and prioritize an LTE communication or an NR communication, wherein, based on the CBR, one or more joint scheduling rules indicate at least one of:

to combine the LTE communication and the NR communication when the CBR does not satisfy a low CBR threshold;

to prioritize a safety-related communication over a non-safety-related communication when the CBR satisfies the low CBR threshold but does not satisfy a high CBR threshold; or to drop or delay at least one of traffic transmissions or receptions by giving priority to safety-related communications when the CBR satisfies the high CBR threshold.

2. The apparatus of claim 1, wherein at least one of the LTE communication and the NR communication is a vehicle-to-everything (V2X) communication.

3. The apparatus of claim 1, wherein the one or more processors, to identify the CBR associated with the half-duplex communication system, are configured to determine that the CBR associated with the half-duplex communication system does not satisfy the low CBR threshold.

4. The apparatus of claim 1, wherein the one or more joint scheduling rules indicate to combine the LTE communication and the NR communication using a time division multiplexing (TDM) operation.

5. The apparatus of claim 4, wherein the one or more processors are further configured to transmit the LTE communication and the NR communication using the TDM operation based at least in part on the one or more joint scheduling rules.

6. The apparatus of claim 1, wherein the one or more processors, to identify the CBR associated with the half-duplex communication system, are configured to determine that the CBR associated with the half-duplex communication system satisfies the low CBR threshold but does not satisfy the high CBR threshold.

7. The apparatus of claim 1, wherein the one or more processors, to prioritize the safety-related communication over the non-safety-related communication, are configured to impose different free resource classification thresholds for the LTE communications and the NR communications.

8. The apparatus of claim 1, wherein the one or more processors, to prioritize the LTE communication or the NR communication, are configured to prioritize an LTE reception based at least in part on the LTE reception being a safety-related reception or a high priority reception.

9. The apparatus of claim 1, wherein the one or more processors, to prioritize the LTE communication or the NR communication, are configured to prioritize an NR reception based at least in part on the NR reception being a safety-related reception or a high priority reception.

10. The apparatus of claim 1, wherein the one or more processors, to identify the CBR associated with the half-duplex communication system, are configured to determine that the CBR associated with the half-duplex communication system satisfies the high CBR threshold.

11. The apparatus of claim 1, wherein the CBR associated with the half-duplex communication system satisfying the high CBR threshold indicates a high traffic congestion condition for both of the LTE communications and the NR communications.

12. The apparatus of claim 1, wherein the one or more processors, to prioritize the LTE communication or the NR communication, are configured to prioritize an LTE reception, and dropping or delaying the NR communication, based at least in part on the LTE reception being a safety-related reception or a high priority reception.

13. The apparatus of claim 1, wherein the one or more processors, to prioritize the LTE communication or the NR communication, are configured to prioritize an NR reception, and dropping or delaying the LTE communication, based at least in part on the NR reception being a safety-related reception or a high priority reception.

14. A method of wireless communication performed by a user equipment (UE), comprising:

obtaining one or more joint scheduling rules associated with Long Term Evolution (LTE) communications and New Radio (NR) communications in a half-duplex communication system;

identifying a channel busy ratio (CBR) associated with the half-duplex communication system; and prioritizing an LTE communication or an NR communication, wherein, based on the CBR, one or more joint scheduling rules indicate at least one of:

to combine the LTE communication and the NR communication when the CBR does not satisfy a low CBR threshold;

to prioritize a safety-related communication over a non-safety-related communication when the CBR satisfies the low CBR threshold but does not satisfy a high CBR threshold; or to drop or delay at least one of traffic transmissions or receptions by giving priority to safety-related communications when the CBR satisfies the high CBR threshold.

15. The method of claim 14, wherein at least one of the LTE communication and the NR communication is a vehicle-to-everything (V2X) communication.

16. The method of claim 14, wherein identifying the CBR associated with the half-duplex communication system comprises determining that the CBR does not satisfy the low CBR threshold.

17. The method of claim 14, wherein the one or more joint scheduling rules indicate to combine the LTE communication and the NR communication using a time division multiplexing (TDM) operation.

18. The method of claim 17, further comprising transmitting the LTE communication and the NR communication using the TDM operation based at least in part on the one or more joint scheduling rules.

19. The method of claim 14, wherein identifying the CBR associated with the half-duplex communication system comprises determining that the CBR satisfies the low CBR threshold but does not satisfy the high CBR threshold.

20. The method of claim 14, wherein prioritizing the safety-related communication over the non-safety-related communication comprises imposing different free resource classification thresholds for the LTE communications and the NR communications.

21. The method of claim 14, wherein prioritizing the LTE communication or the NR communication comprises prioritizing an LTE reception based at least in part on the LTE reception being a safety-related reception or a high priority reception.

22. The method of claim 14, wherein prioritizing the LTE communication or the NR communication comprises prioritizing an NR reception based at least in part on the NR reception being a safety-related reception or a high priority reception.

23. The method of claim 14, wherein identifying the CBR associated with the half-duplex communication system comprises determining that the CBR satisfies the high CBR threshold.

24. The method of claim 14, wherein the CBR satisfying the high CBR threshold indicates a high traffic congestion condition for both the LTE communications and the NR communications.

25. The method of claim 14, wherein prioritizing the LTE communication or the NR communication comprises prioritizing an LTE reception, and dropping or delaying the NR communication, based at least in part on the LTE reception being a safety-related reception or a high priority reception.

26. The method of claim 14, wherein prioritizing the LTE communication or the NR communication comprises prioritizing an NR reception, and dropping or delaying the LTE communication, based at least in part on the NR reception being a safety-related reception or a high priority reception.

27. A non-transitory computer-readable medium storing a set of instructions for wireless communication, the set of instructions comprising:

one or more instructions that, when executed by one or more processors of a user equipment (UE), cause the UE to:

obtain one or more joint scheduling rules associated with Long Term Evolution (LTE) communications and New Radio (NR) communications in a half-duplex communication system;

identify a channel busy ratio (CBR) associated with the half-duplex communication system; and prioritize an LTE communication or an NR communication, wherein, based on the CBR, one or more joint scheduling rules indicate at least one of:

to combine the LTE communication and the NR communication when the CBR does not satisfy a low CBR threshold;

to prioritize a safety-related communication over a non-safety-related communication when the CBR satisfies the low CBR threshold but does not satisfy a high CBR threshold; or to drop or delay at least one of traffic transmissions or receptions by giving priority to safety-related communications when the CBR satisfies the high CBR threshold.

28. The non-transitory computer-readable medium of claim 27, wherein at least one of the LTE communication and the NR communication is a vehicle-to-everything (V2X) communication.

29. An apparatus for wireless communication, comprising:

means for obtaining one or more joint scheduling rules associated with Long Term Evolution (LTE) communications and New Radio (NR) communications in a half-duplex communication system;

means for identifying a channel busy ratio (CBR) associated with the half-duplex communication system; and means for prioritizing an LTE communication or an NR communication, wherein, based on the CBR, one or more joint scheduling rules indicate at least one of:

to combine the LTE communication and the NR communication when the CBR does not satisfy a low CBR threshold;

to prioritize a safety-related communication over a non-safety-related communication when the CBR satisfies the low CBR threshold but does not satisfy a high CBR threshold; or to drop or delay at least one of traffic transmissions or receptions by giving priority to safety-related communications when the CBR satisfies the high CBR threshold.

30. The apparatus of claim 29, further comprising means for determining that at least one of the LTE communication and the NR communication is a vehicle-to-everything (V2X) communication.

* * * * *